(12) United States Patent
Taira et al.

(10) Patent No.: US 7,215,627 B2
(45) Date of Patent: May 8, 2007

(54) METHOD AND APPARATUS OF PROCESSING AUDIO INFORMATION HAVING SYSTEM HEADER

(75) Inventors: Kazuhiko Taira, Yokohama (JP); Hideki Mimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1049 days.

(21) Appl. No.: 10/330,008

(22) Filed: Dec. 27, 2002

(65) Prior Publication Data

US 2003/0133701 A1 Jul. 17, 2003

(30) Foreign Application Priority Data

Dec. 27, 2001 (JP) .............................. 2001-397448

(51) Int. Cl.
*G11B 27/00* (2006.01)
(52) U.S. Cl. ........................ 369/83; 369/47.13; 386/52
(58) Field of Classification Search .................. 386/46, 386/52, 54, 95, 96; 369/47.13, 83, 84, 124.07
See application file for complete search history.

(56) References Cited

U.S. PATENT DOCUMENTS 5,630,006 A 5/1997 Hirayama et al.
5,636,200 A 6/1997 Taira et al.

FOREIGN PATENT DOCUMENTS

| JP | 11-120748 | 4/1999 |
|----|-----------|--------|
| JP | 3026808 | 1/2000 |
| JP | 2000-82276 | 3/2000 |
| JP | 2001-266496 | 9/2001 |

*Primary Examiner*—Thai Q. Tran
*Assistant Examiner*—Mishawn Dunn
(74) *Attorney, Agent, or Firm*—Pillsbury Winthrop Shaw Pittman, LLP

(57) ABSTRACT

When a portion of an audio object comprising a head pack having a system header is to be deleted, a copy of the system header of the pack is inserted in a pack which is the end boundary of deletion. This gives a new head pack after the deletion a system header having the same contents as the deleted pack. Even when audio data comprising a system header is partially deleted by editing or the like and the system header disappears, this system header can be reproduced.

12 Claims, 19 Drawing Sheets

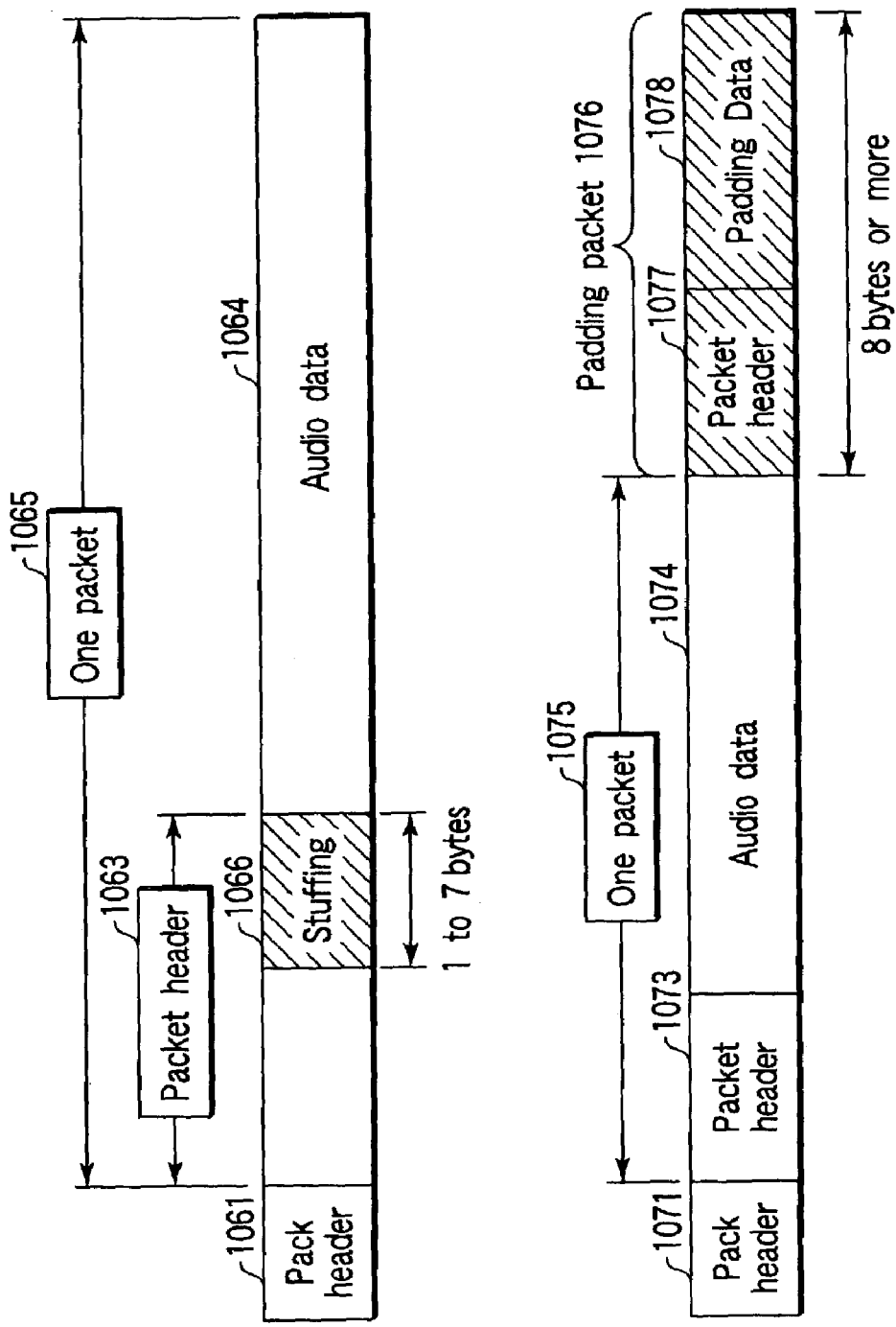
F I G. 3A
F I G. 3B

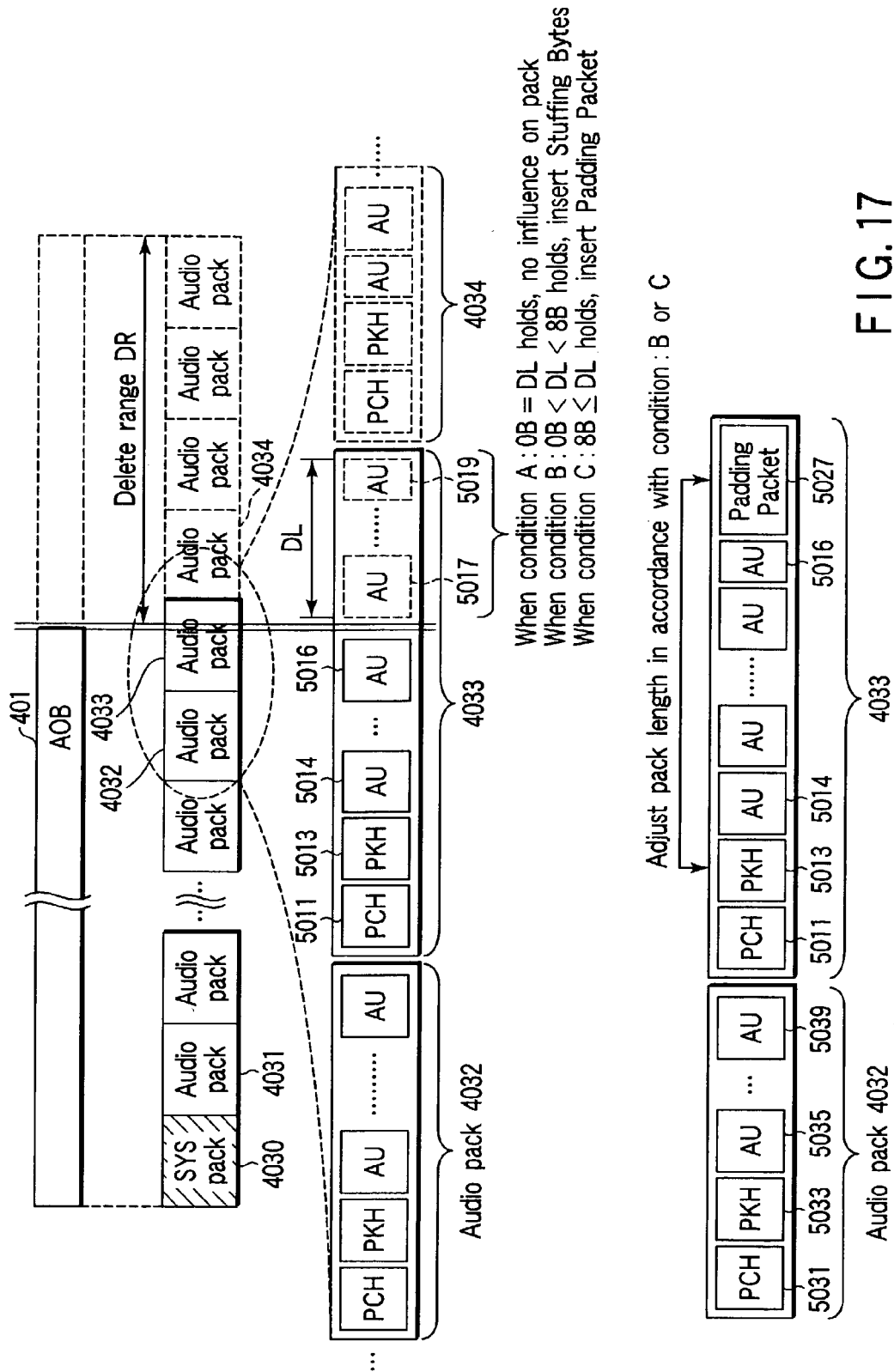
F I G. 17

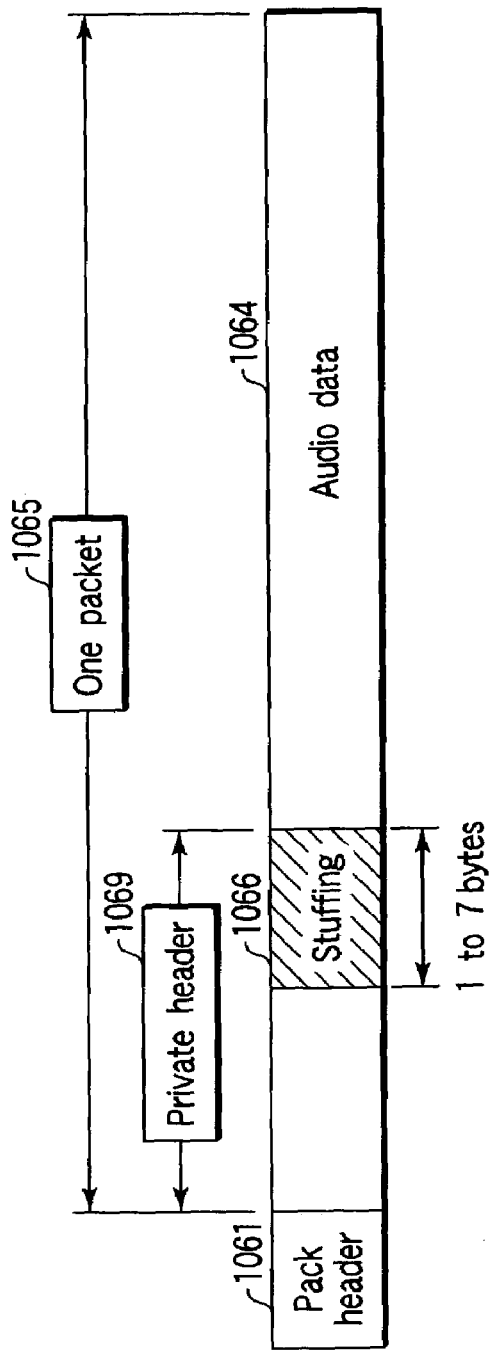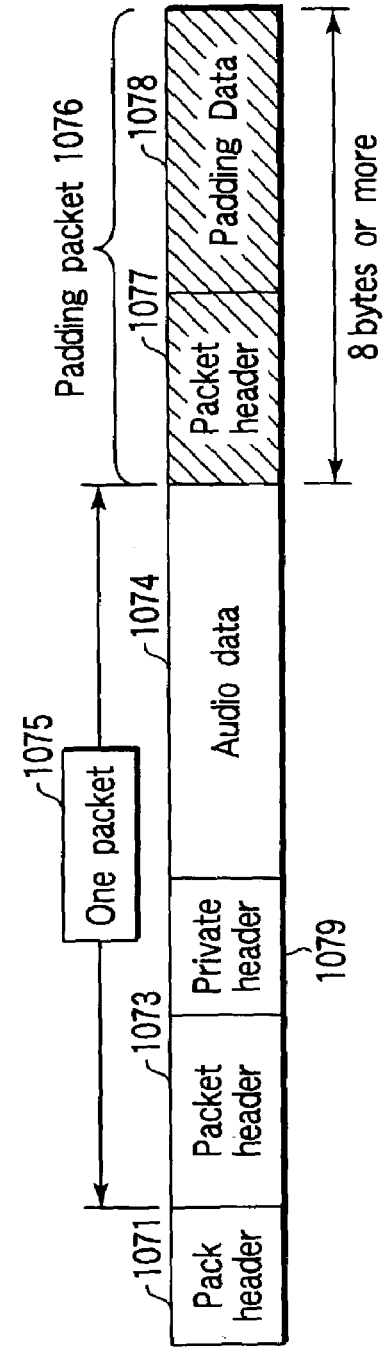
F I G. 18A  F I G. 18B

METHOD AND APPARATUS OF PROCESSING AUDIO INFORMATION HAVING SYSTEM HEADER

CROSS-REFERENCE TO RELATED APPLICATIONS

This application is based upon and claims the benefit of priority from the prior Japanese Patent Application No. 2001-397448, filed Dec. 27, 2001, the entire contents of which are incorporated herein by reference.

BACKGROUND OF THE INVENTION

1. Field of the Invention

The present invention relates to a method and apparatus of processing audio data having a system header and, more particularly, to a method and apparatus of recording a system header of audio data formed by a program stream based on the MPEG (Moving Picture Experts Group) standard.

2. Description of the Related Art

A prior art disclosing an AV (Audio Visual) data recording/playback system for mainly recording video data is described in, e.g., Japanese Patent No. 3026808. The prior art aims to facilitate recording and editing and realize on-memory time search by using a memory LSI (Large Scale Integrated circuit) of about 512 KB. AV data processed in this system is based on a program stream of the MPEG standard. The AV data includes one or more GOPs (Group Of Pictures), and is configured as a GOP set (VOB: Video OBject) having a VOBU (Video OBject Unit) structure whose playback time is 0.4 to 1.0 sec. Manager data for managing the AV data has time search information. The time search information has a hierarchical structure in which time entry information indicating time entry for, e.g., every 10 sec is added to VOBU entry information for managing each VOBU information as an entry table.

In the above prior art, recording of video data is essential, so the recording time for a DVD (Digital Versatile Disk) disk capacity of 4.7 GB is about 8 hrs. Therefore, even a time map structure for all entries of VOBU information (3 bytes: size and access information) whose playback time unit is about 0.5 sec occupies a capacity of at most about 200 KB. This is not a serious problem compared to the whole manager data processed in on-memory processing. Also, in the above prior art, by inserting a system header for each VOBU which forms a VOB, editing based on an MPEG program stream can be processed for each VOBU.

On the other hand, an audio data recording/playback system (e.g., a system of the DVD audio recording standard) for mainly recording audio data can record only sound. For example, when a 96-Kbps compressed audio code is used, the recording time for a DVD disk capacity of 4.7 GB reaches about 100 hrs. In this case, 1,000 pieces or more of music can be recorded and played back even when the playing time of one piece of music is about 5 min. Therefore, the manager data (e.g., the time entry information) must handle data of 1,000 pieces or more of music.

If a unit structure (AOBU: Audio OBject Unit) similar to the VOBU in the above-mentioned prior art is used and a set (AOB) of this AOBU structure whose unit is 1 sec is formed for audio data of 1,000 pieces or more of music, the size of a table of AOBU entry information (2 bytes: size and access information) exceeds 700 KB. Consequently, this information alone increases the load on the on-memory processing and makes other important manager data difficult to process.

That is, the conventional video recording system constructs a video data unit structure having a system header at its start on a large-capacity disk. The system poses no problem because editing is performed for each unit. However, an audio recording system capable of recording audio data on a large-capacity disk by using various compression systems can record and play back 1,000 pieces of music for about 100 hrs. Accordingly, in the hierarchical structure of an audio data unit structure, the size manager data comprising a time map and the like becomes enormous and exceeds the range capable of being processed by on-memory processing if the memory size is at most about 512 KB.

On the other hand, if a unit structure is disused to reduce this enormous manager data and make rapid on-memory processing feasible, a system header disappears by deletion, editing, or the like.

BRIEF SUMMARY OF THE INVENTION

The present invention is directed to method and apparatus that substantially obviates one or more of the problems due to limitations and disadvantages of the related art.

An object of the present invention is to provide a method capable of reproduce a system header even if the system header disappears because audio data comprising this system header is partially deleted by editing or the like.

Another object of the present invention is to provide an apparatus capable of reproduce a system header even if the system header disappears because audio data comprising this system header is partially deleted by editing or the like.

According to an embodiment of the present invention, a method of processing information comprising a system header at a head of a program stream based on MPEG standard comprises:

calculating a delete range; and selecting a method of inserting and recording the system header in accordance with the calculated delete range.

According to another embodiment of the present invention, a system header recording method of recording audio data comprising au audio pack having a system header in a program stream having a pack and packet structure based on MPEG standard inserts and records a system dedicated pack comprising the system header in a position immediately preceding the audio pack comprising a delete point of the audio data regardless of a delete range in the audio pack comprising a delete point of the audio data.

According to a still another embodiment of the present invention, an apparatus for processing information comprising a system header at a head of a program stream based on MPEG standard comprises:

a calculator which calculates a delete range; and a selector which selects a method of inserting and recording the system header in accordance with the calculated delete range.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIGS. 3A and 3B are views for explaining a method of adjusting the pack length of a data pack used in the first embodiment;

FIG. 17 is a view for explaining a method of inserting a system header in a system dedicated pack when a portion (rear side) of an audio object AOB is deleted in a fifth embodiment of the present invention;

FIGS. 18A and 18B are views for explaining a method of adjusting the pack length of a data pack used in a sixth embodiment of the present invention.

DETAILED DESCRIPTION OF THE INVENTION

An embodiment of an audio data processing system according to the present invention will be described below with reference to the accompanying drawing. A description will be made by assuming that each system is applied to an audio data digital recording system (more specifically, a DVD audio recording system) using an MPEG program stream.

Figure 1:
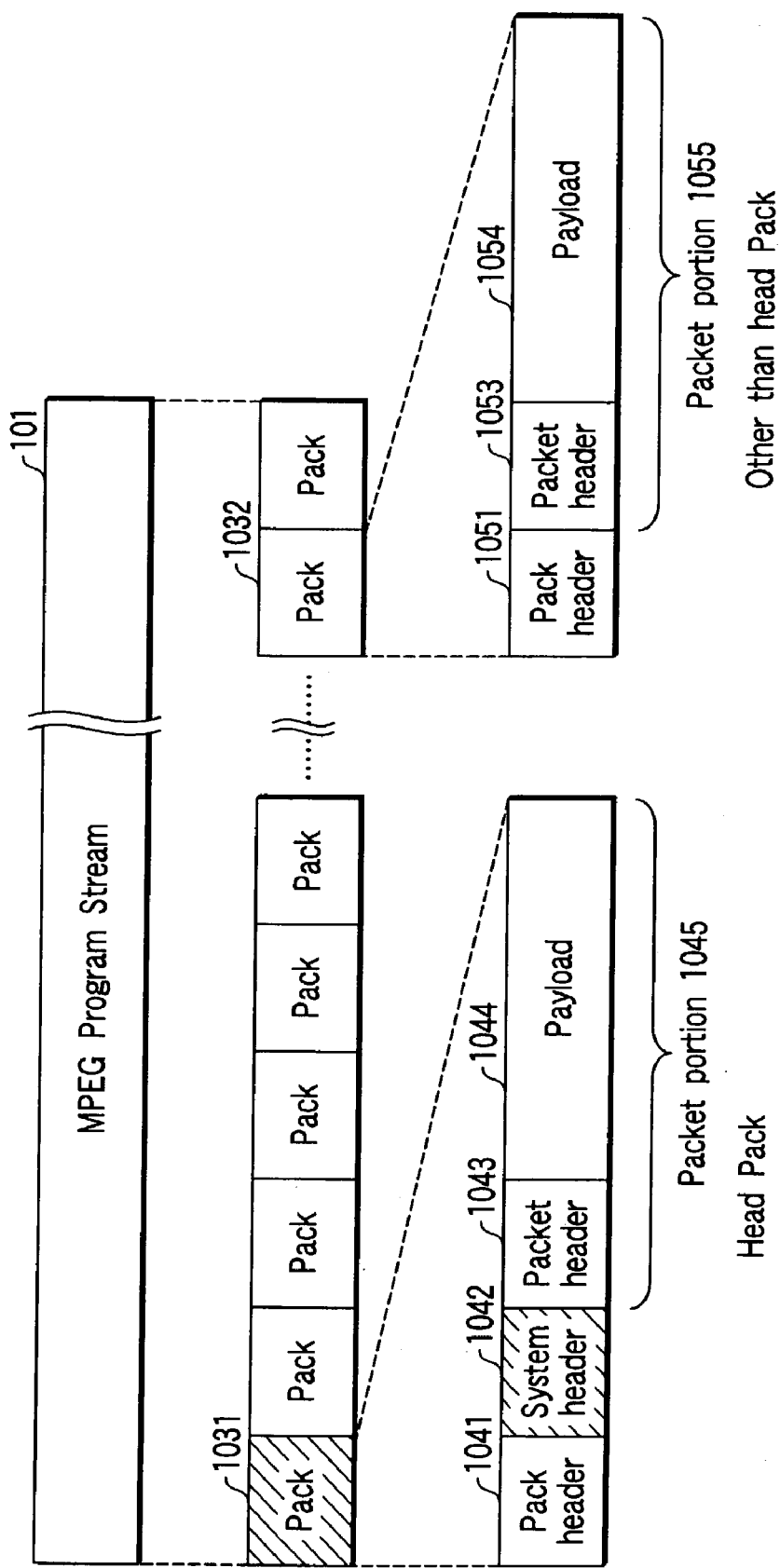
FIG. 1 is a view for explaining the basic structure of an MPEG program stream used in a first embodiment of the present invention.

FIG. 1 is a view for explaining the basic structure of an MPEG program stream used in the first embodiment.

The MPEG standard specifies that a system header 1042 must be inserted in a head pack 1031 of a program stream 101. The head pack 1031 includes a pack header 1041, the system header 1042, a packet header 1043, and a payload (information contents) 1044. The packet header 1043 and payload 1044 form a packet portion 1045.

Insertion of a system header is an option except for the head pack 1031 of the MPEG program stream 101, so many packs (e.g., 1032) having no system header are present. The non-head pack 1032 having no system header includes a pack header 1051, packet header 1053, and payload 1054. The packet header 1053 and payload 1054 form a packet portion 1055 of the non-head packet 1032.

Figure 2:
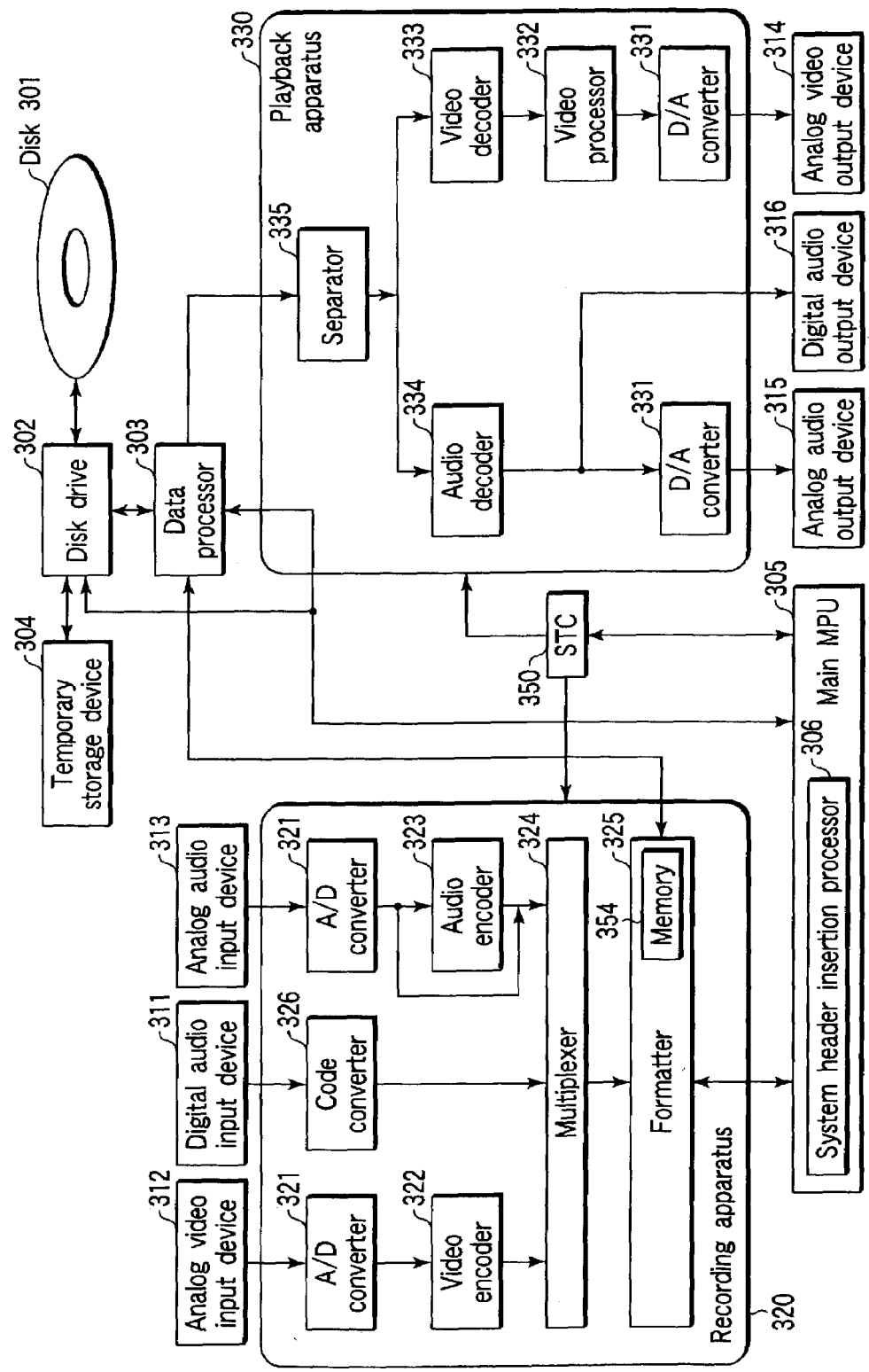
FIG. 2 is a block diagram for explaining the arrangement of an audio data recording/playback apparatus according to the first embodiment.

FIG. 2 is a block diagram for explaining the arrangement of an audio data recording/playback apparatus according to the first embodiment. A main MPU 305 controls a recording apparatus 320 and playback apparatus 330 based on a reference clock from a system time clock STC 350. Based on the control of the main MPU 305, contents input from various input devices (a digital audio input device 311, analog video input device 312, and analog audio input device 313) are recorded on a disk (DVD) 301 via the recording apparatus 320, a data processor 303, and a disk drive 302. While recording for the disk 301 is unprepared, the contents to be recorded are temporarily stored in a temporary storage device 304.

Based on the control of the main MPU 305, contents read out from the disk 301 via the disk driver 302 and data processor 303 are subjected to a predetermined playback process by the playback apparatus 330, and output to various output devices (an analog video output device 314, analog audio output device 315, and digital audio output device 316).

In the recording apparatus 320, input video data from the analog video input device 312 is input to a video encoder 322 via an A/D converter 321, encoded by the video encoder 322, and supplied to a multiplexer 324. Similarly, input audio data from the analog audio input device 313 is input to an audio encoder 323 via another A/D converter 321, suitably encoded by the audio encoder 323, and supplied to the multiplexer 324. Also, input audio data from the digital audio input device 311 is input to a code converter 326. The code converter 326 decompresses the audio data compressed by a specific audio compression system (e.g., MP3, AAC, AC3, or packed PCM), and converts the code of the decompressed information into linear PCM. If the input digital audio data is a linear PCM signal, the linear PCM signal is passed through the converter 326. The linear PCM signal from the code converter 326 (or the audio data not subjected to the code conversion by this converter 326) is supplied to the multiplexer 324.

The multiplexer 324 multiplexes the supplied data (e.g., the video data and audio data) into an MPEG program stream (101 in FIG. 1). The multiplexed stream is processed by a formatter 325 under the control of a system header insertion processor 306 in the main MPU 305. The processing appropriately performs insertion of a system header, pack adjustment by stuffing bytes and/or a padding packet, and insertion of additional information. In this manner, a data structure according to the first embodiment of the present invention is formed and recorded on the disk 301.

In the playback apparatus 330, manager data and the multiplexed stream are extracted from the contents read out from the disk 301. The extracted manager data and multiplexed stream are supplied to the main MPU 305 and a separator 335, respectively. The separator 335 separates the multiplexed MPEG program stream into audio data, video data, and the like. The separated audio data is decoded by an audio decoder 334 and output to the digital audio output device 316 or output to the analog audio output device 315 via a D/A converter 331. Likewise, the separated video data is decoded by a video decoder 333 and supplied to a video processor 332. The video processor 332 synthesizes predetermined information (e.g., a menu or title information) on the decoded video data, and outputs the synthetic information to the analog video output device 314. Also, the additional information (e.g., copy control information) contained in the contents read out from the disk 301 is supplied to the main MPU 305.

FIGS. 3A and 3B are views for explaining a method of adjusting the pack length of a data pack used in the first embodiment. FIGS. 3A and 3B illustrate a method of adjusting a pack length of 2,048 bytes in a pack of a pack string forming reproduced data AOB based on an MPEG program stream which is recorded by the recording/playback apparatus as shown in FIG. 2. One packet is normally stored in one pack, and each pack includes a pack header (1061 or 1071), packet header (1063 or 1073), and packet data (1064 or 1074).

FIG. 3A shows a packet structure wherein the pack length is adjusted by inserting stuffing bytes 1066 in the packet header 1063 if an interval of 1 to 7 bytes (or 1 to 15 bytes) is present in the packet header 1063.

FIG. 3B shows a packet structure wherein the pack length is adjusted by using a padding packet 1076 if an interval of 8 bytes or more (or 9 to 16 bytes or more) is present. These pack length adjusting data (staffing bytes 1066 and padding packet 1076) are discarded when reproduced data is decoded.

Figure 4:
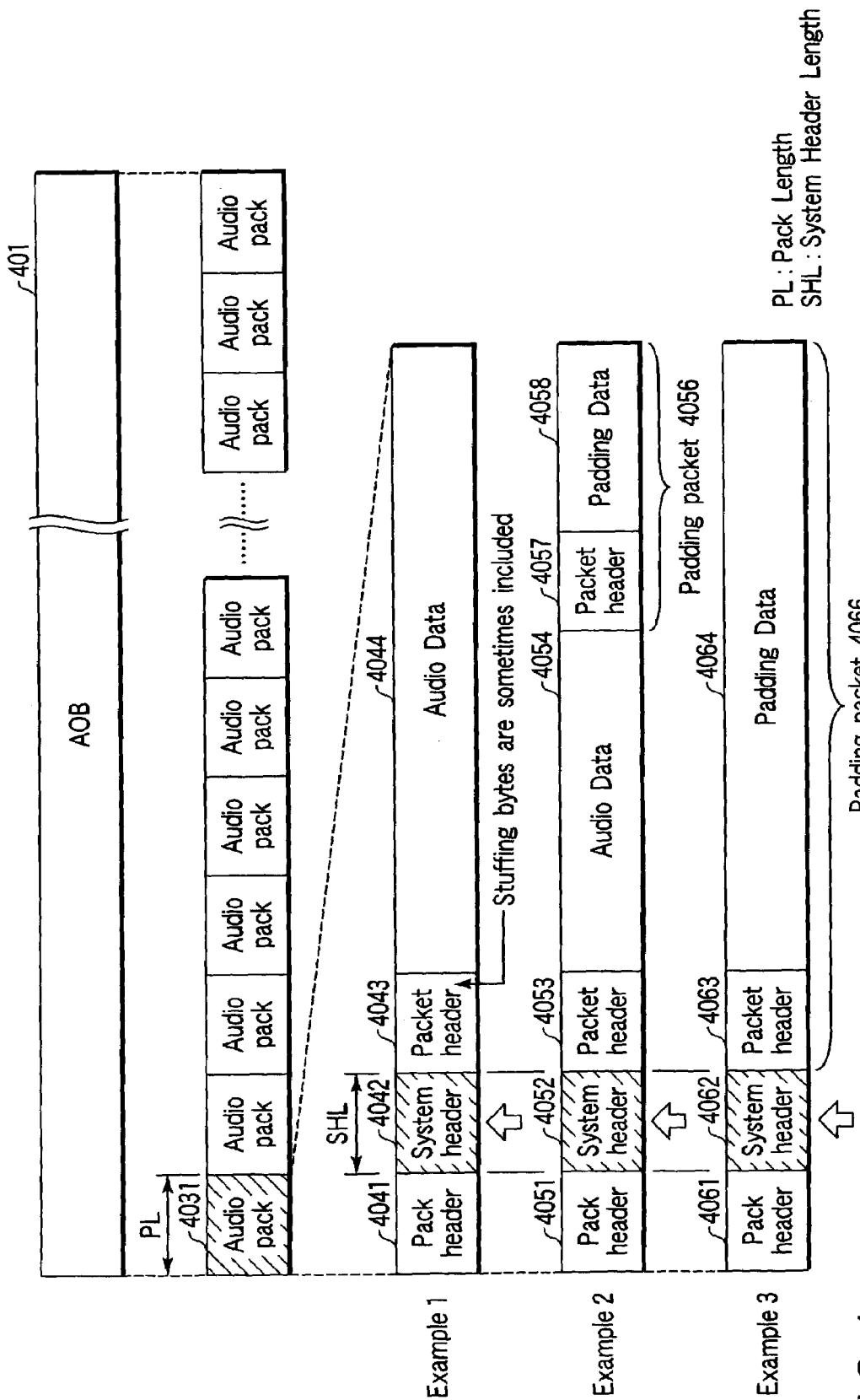
FIG. 4 is a view for explaining a method of adding a system header to the head audio pack of an audio object AOB in the first embodiment.

FIG. 4 is a view for explaining a method of adding a system header to the head audio pack of an audio object AOB in the first embodiment. FIG. 4 shows the forms of packs when system headers 4042, 4052, and 4062 are inserted in an audio pack 4031. An audio object (AOB) 401 including the audio pack 4031 is based on an MPEG program stream, and the system headers 4042, 4052, and 4062 are inserted in the stream head pack 4031. The pack length of this head pack 4031 is represented by PL (Pack Length), and the data length of the system headers 4042, 4052, and 4062 in the head pack 4031 is represented by SHL (System Header Length). In this embodiment, PL is 2,048 bytes, and SHL is 18 bytes.

Example 1 shows the form of a pack wherein the audio pack 4031 having the system header 4042 after a pack header 4041 includes only an audio packet (audio data 4044). In this pack, the pack length can be properly adjusted by stuffing bytes in a packet header 4043 after the system header 4042.

Example 2 shows the form of a pack when the audio pack 4031 having the system header 4052 after a pack header 4051 includes both an audio packet (audio data 4054) and a padding packet 4056. In this pack, a packet header 4053 follows the system header 4052, the audio data 4054 follows the packet header 4053, and the padding packet 4056 follows the audio data 4054. The padding packet 4056 includes a packet header 4057 and padding data 4058 following the packet header 4057.

Example 3 shows the form of a pack when the audio pack 4031 having the system header 4062 after a pack header 4061 includes only a padding packet 4066. In this pack, the padding packet 4066 follows the system header 4062. The padding packet 4066 includes a packet header 4063 and padding data 4064 following the packet header 4063.

Unlike the VOBU structure in the video recording standard to facilitate access to and editing of a TV program of about 1 hr, no time map (AOBU structure) is particularly necessary for each piece of music of about 3 to 5 min in the audio recording standard. Therefore, to suppress the increase in the manager data amount when a data structure is configured by the unit structure (VOBU/AOBU) comprising a system header at its start, an AOB structure (mainly representing a musical piece unit) including a pack string is defined in FIG. 4 instead of the unit structure (AOBU structure). However, if the head portion of the AOB is deleted by editing or the like, a system header disappears, so the AOB structure 401 in this state deviates from an MPEG program stream. A countermeasure against this problem will be explained below with reference to the drawing on and after FIG. 5.

Figure 5:
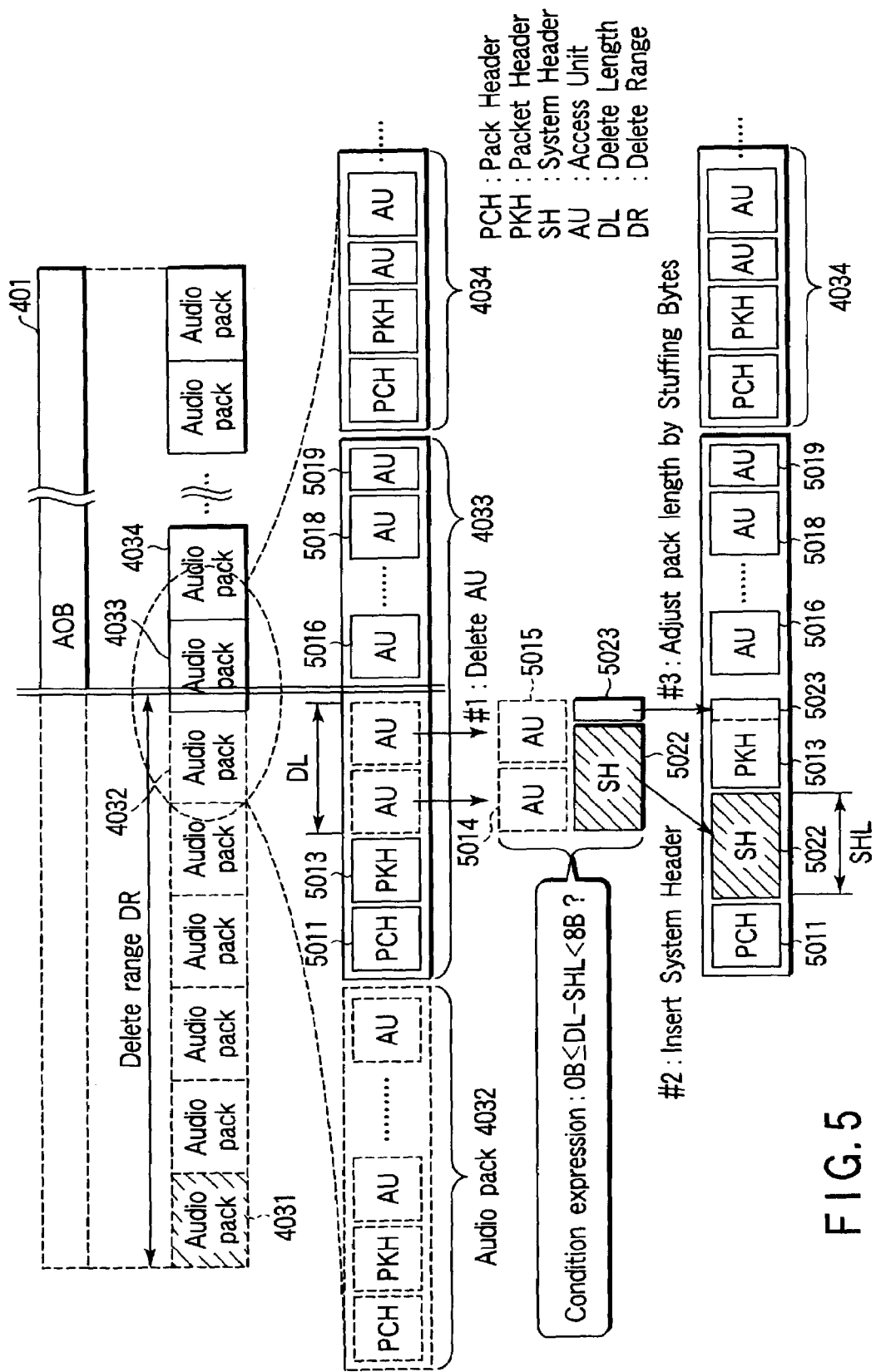
FIG. 5 is a view for explaining a system header insertion method (No. 1) when the audio object AOB is partially deleted in the first embodiment.
Figure 6:
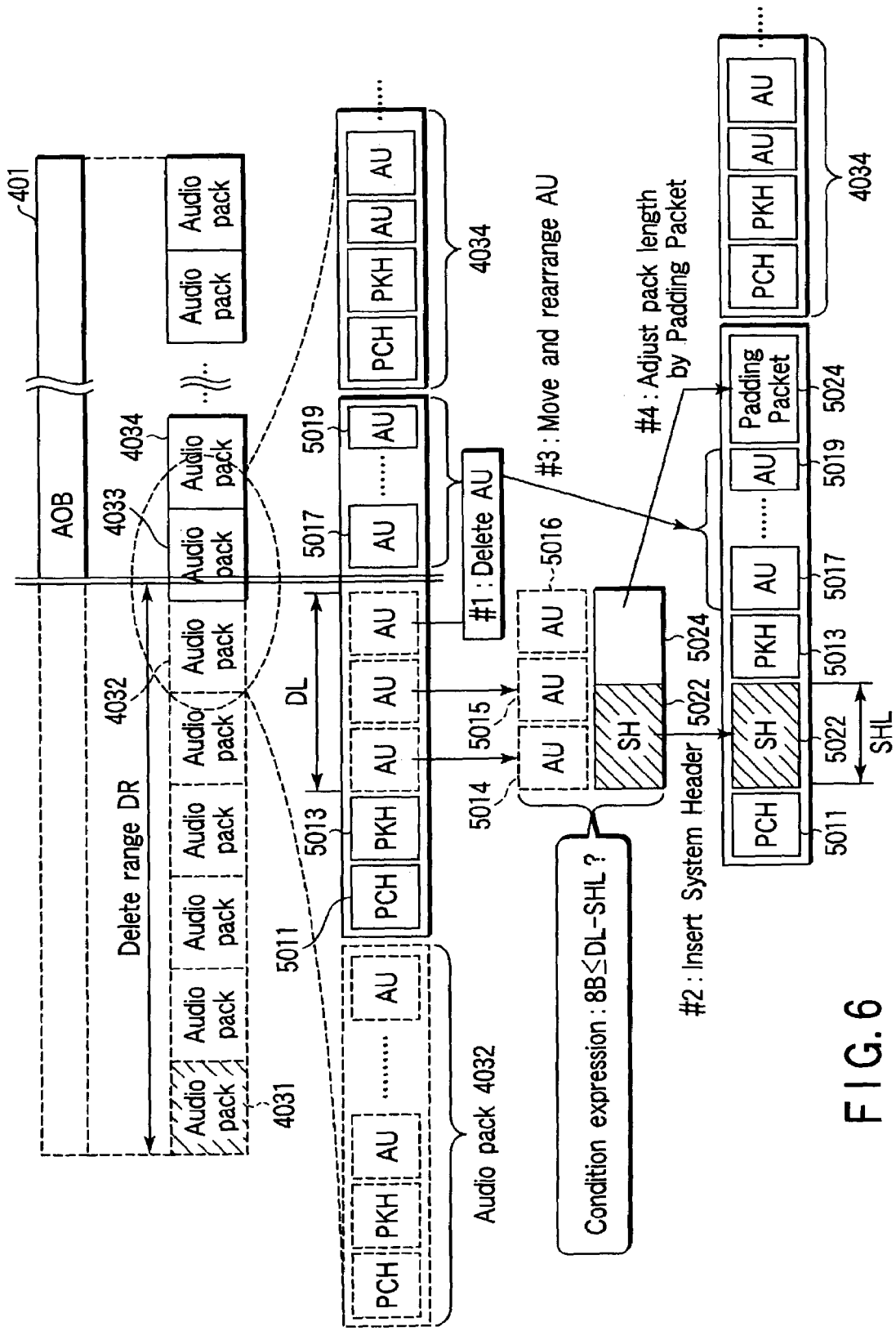
FIG. 6 is a view for explaining a system header insertion method (No. 2) when the audio object AOB is partially deleted in the first embodiment.
Figure 7:
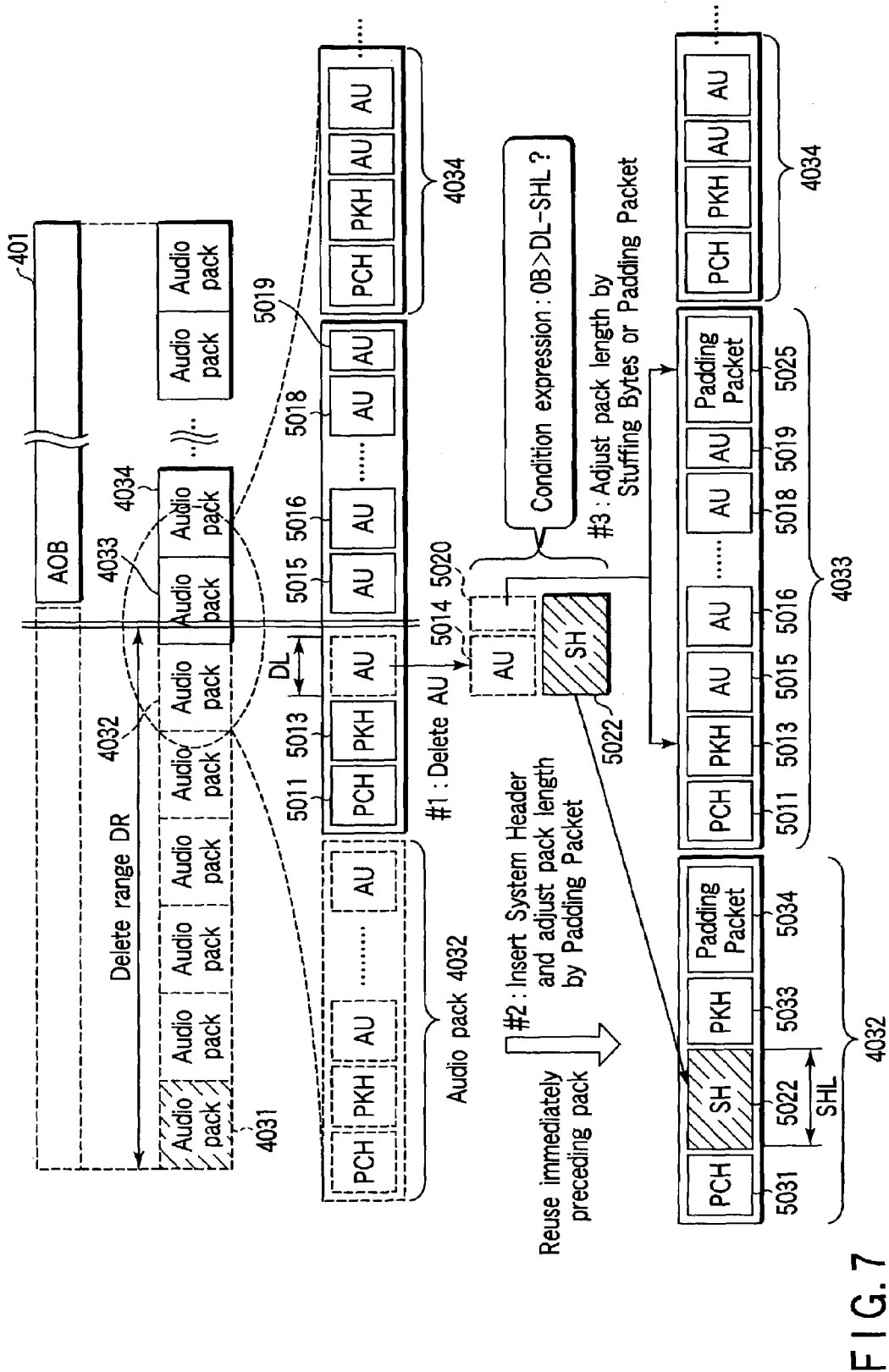
FIG. 7 is a view for explaining a system header insertion method (No. 3) when the audio object AOB is partially deleted in the first embodiment.

In FIGS. 5 to 7, it is assumed that a region from a head pack 4031 comprising a system header 5022 to AU (Access Unit) as a decoding unit in an audio pack 4033 at the end point of a delete range DR is deleted in certain reproduced data (AOB) 401. In accordance with condition determination with regard to a difference (DL−SHL) between the size of a delete length DL and the size of a system header length SHL, selecting and practicing a method of inserting a system header are changed. The unit of deletion is AU in the audio pack 4033.

FIG. 5 is a view for explaining a system header insertion method (No. 1) when an audio object AOB is partially deleted. The insertion method shown in FIG. 5 is selected when a determination condition expression (0 B≦DL−SHL<8 B; "B" indicates byte) holds in the audio pack 4033 at the end point of deletion. The method adjusts the length of the pack 4033 by inserting the system header 5022 between a pack header 5011 and packet header PKH 5013 in the audio pack 4033, and inserting stuffing bytes 5023 of 0 to 7 bytes in the packet header PKH 5013. In addition, the method appropriately corrects address and/or size information in the packet header PKH 5013 to complete the deletion process for the reproduced data AOB 401.

FIG. 6 is a view for explaining a system header insertion method (No. 2) when an audio object AOB is partially deleted. The insertion method shown in FIG. 6 is selected when a determination condition expression (8 B≦DL−SHL) holds in the audio pack 4033 at the end point of deletion. The system header 5022 is inserted between the pack header 5011 and packet header PKH 5013 in the audio pack 4033, and remaining access units AU (5015 to 5019) in the audio pack 4033 are placed subsequently to the packet header PKH 5013. In this manner, the audio pack 4033 is reconstructed. Also, the pack length is adjusted by appropriately inserting a padding packet 5025 of 8 bytes or more subsequently to the audio pack 4033. Furthermore, the method appropriately corrects address and/or size information in the packet header PKH 5013 to complete the deletion process for the reproduced data AOB 401.

FIG. 7 is a view for explaining a system header insertion method (No. 3) when an audio object AOB is partially deleted. The insertion method shown in FIG. 7 is selected when a determination condition expression (0 B>DL−SHL) holds in the audio pack 4033 at the end point of deletion. The method uses an audio pack 4032 immediately preceding the audio pack 4033. That is, the method adjusts the length of the pack 4032 by inserting the system header 5022 between a pack header 5031 and packet header PKH 5033 in the immediately preceding audio pack 4032, and inserting a padding packet 5034 in the entire data interval following the packet header PKH 5033 in the pack 4032. In addition, the method makes the immediately preceding audio pack 4032 effective by appropriately correcting address and size information in the packet header PKH 5033. Also, similar to FIGS. 5 and 6, the method appropriately corrects the contents of the audio pack 4033 to complete the deletion process for the reproduced data AOB 401.

Figure 8:
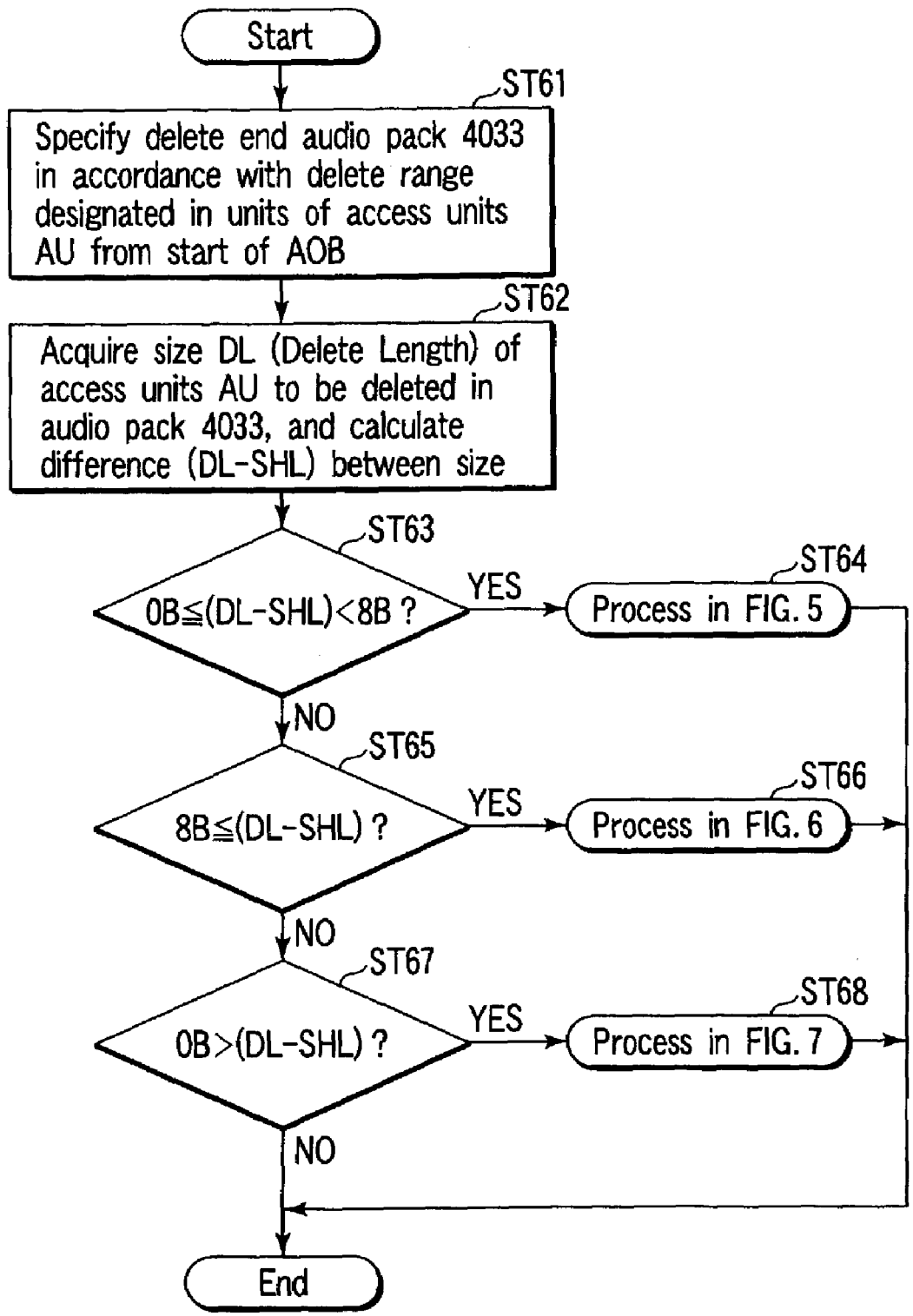
FIG. 8 is a flow chart for explaining the method of the system header insertion process according to the first embodiment.

FIG. 8 is a flow chart for explaining the method of the system header insertion process according to the first embodiment of the present invention. First, a delete range DR is specified in units of access units AU (playback decoding units) from the start of reproduced data AOB 401. When this delete range DR is specified, an audio pack 4033 at the end point of deletion is specified in accordance with the range DR (step ST61).

Next, a size DL of access units AU (5014 and 5015 in FIG. 5, 5014 to 5016 in FIG. 6, and 5014 in FIG. 7) to be deleted in this audio pack 4033 is acquired, and a difference (DL−SHL) between this size DL and a system header size SHL to be inserted is calculated (step ST62).

Determination is then performed using a determination condition expression: 0 B≦(DL−SHL)<8 B (step ST63). If this determination is true (YES in step ST63), the process shown in FIG. 5 is executed in accordance with a flow chart shown in FIG. 9 to be described later (step ST64), and the system header insertion process is complete.

If the determination by 0 B≦(DL−SHL)<8 B is false (NO in step ST63), determination using a determination condition expression: 8 B≦(DL−SHL) is performed (step ST65). If this determination is true (YES in step ST65), the process shown in FIG. 6 is executed in accordance with a flow chart shown in FIG. 10 to be described later (step ST66), and the system header insertion process is complete.

If the determination of 8 B≦(DL−SHL) is false (NO in step ST65), determination using a determination condition expression: 0 B>(DL−SHL) is performed (step ST67). If this determination is true (YES in step ST67), the process shown in FIG. 7 is executed in accordance with a flow chart shown in FIG. 11 to be described later (step ST68), and the system header insertion process is complete. If the determination is false (NO in step ST67), the process is immediately terminated.

Figure 9:
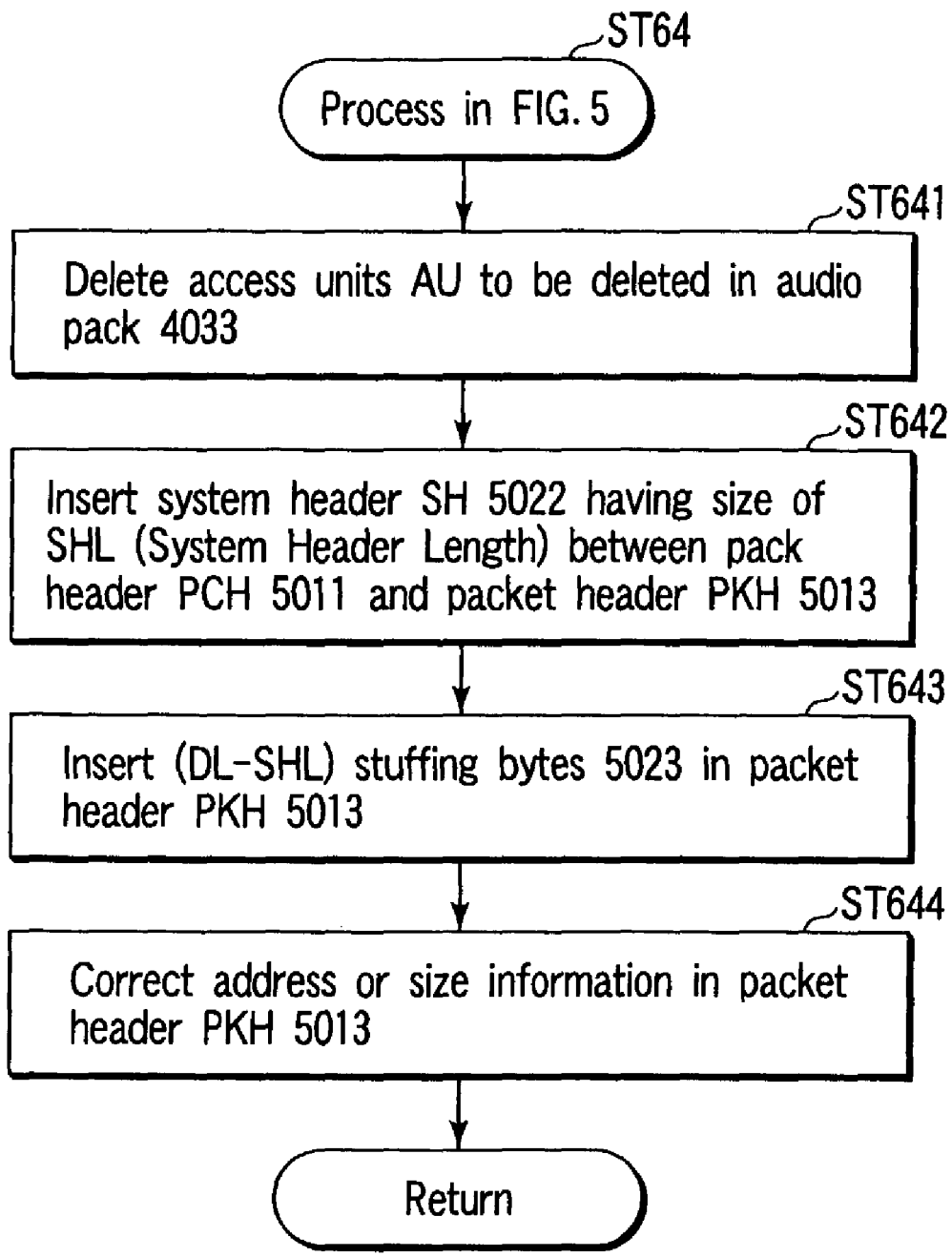
FIG. 9 is a flow chart for explaining the processing in step ST64 of FIG. 8.

FIG. 9 is a flow chart for explaining the contents of the processing in step ST64 in FIG. 8 (i.e., the method of inserting the system header 5022 in the process shown in FIG. 5). First, access units AU (5014 and 5015 in FIG. 5) to be deleted in this audio pack 4033 are deleted (step ST641). Next, a system header SH 5022 having a size SHL (System Header Length) is inserted between a pack header PCH 5011 and packet header PKH 5013 (step ST642). (DL−SHL) stuffing bytes 5023 are then inserted in the packet header PKH 5013 (step ST643). Address and/or size information in the packet header PKH 5013 is appropriately corrected (step ST644). In this way, the system header insertion process in step ST64 is complete.

Figure 10:
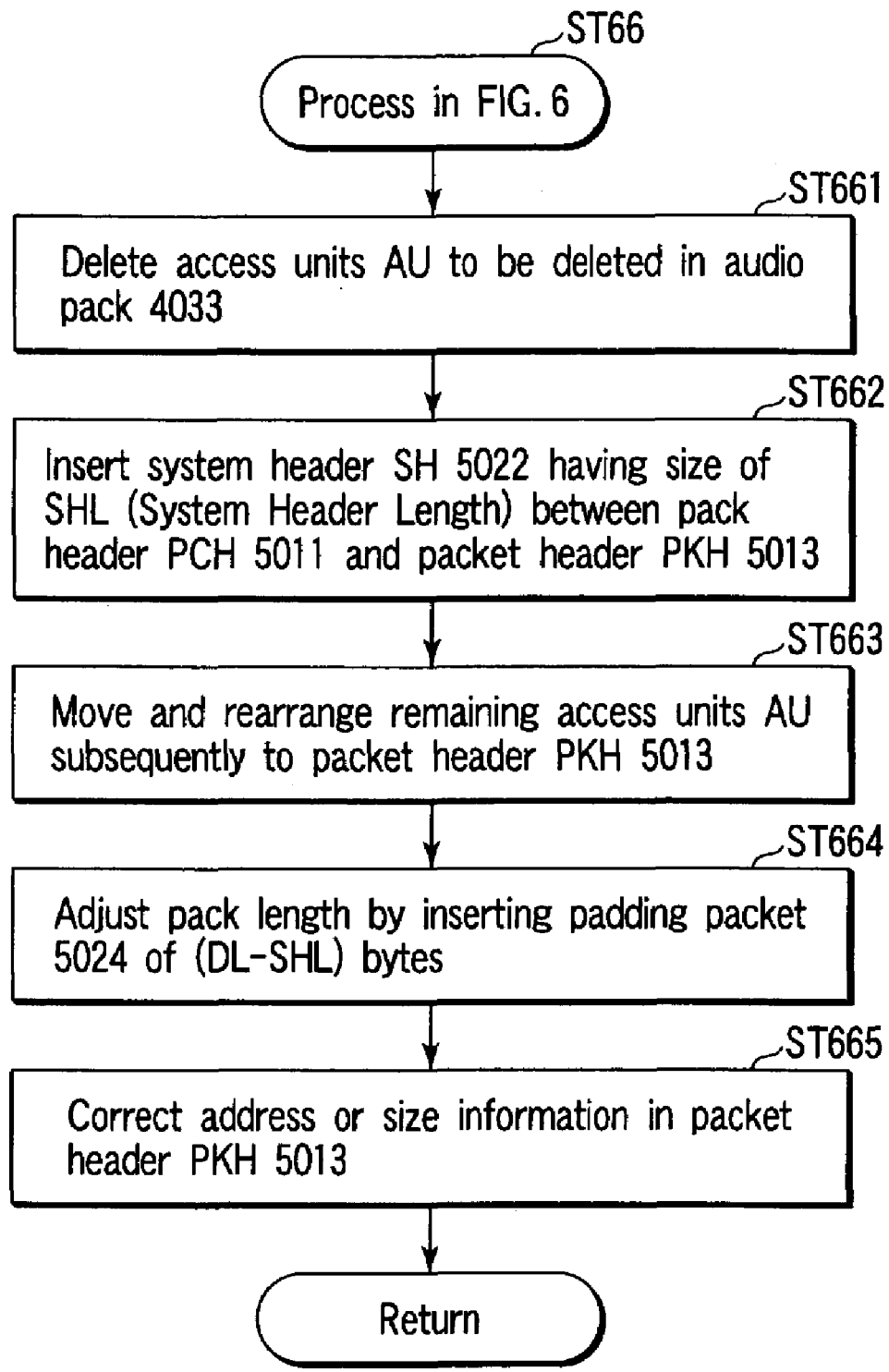
FIG. 10 is a flow chart for explaining the processing in step ST66 of FIG. 8.

FIG. 10 is a flow chart for explaining the contents of the processing in step ST66 in FIG. 8 (i.e., the method of inserting the system header 5022 in the process shown in FIG. 6). First, access units AU (5014 to 5016 in FIG. 6) to be deleted in this audio pack 4033 are deleted (step ST661). Next, a system header SH 5022 having a size SHL (System Header Length) is inserted between a pack header PCH 5011 and packet header PKH 5013 (step ST662). Remaining access units AU (5017 to 5019 in FIG. 6) are then rearranged as they are moved to follow the packet header PKH 5013 (step ST663). A padding packet 5024 of (DL−SHL) bytes is inserted following the last access unit AU 5019 in this audio pack 4033, thereby adjusting the pack length (step ST664). Address and/or size information in the packet header PKH 5013 is appropriately corrected (step ST665). In this way, the system header insertion process in step ST66 is complete.

Figure 11:
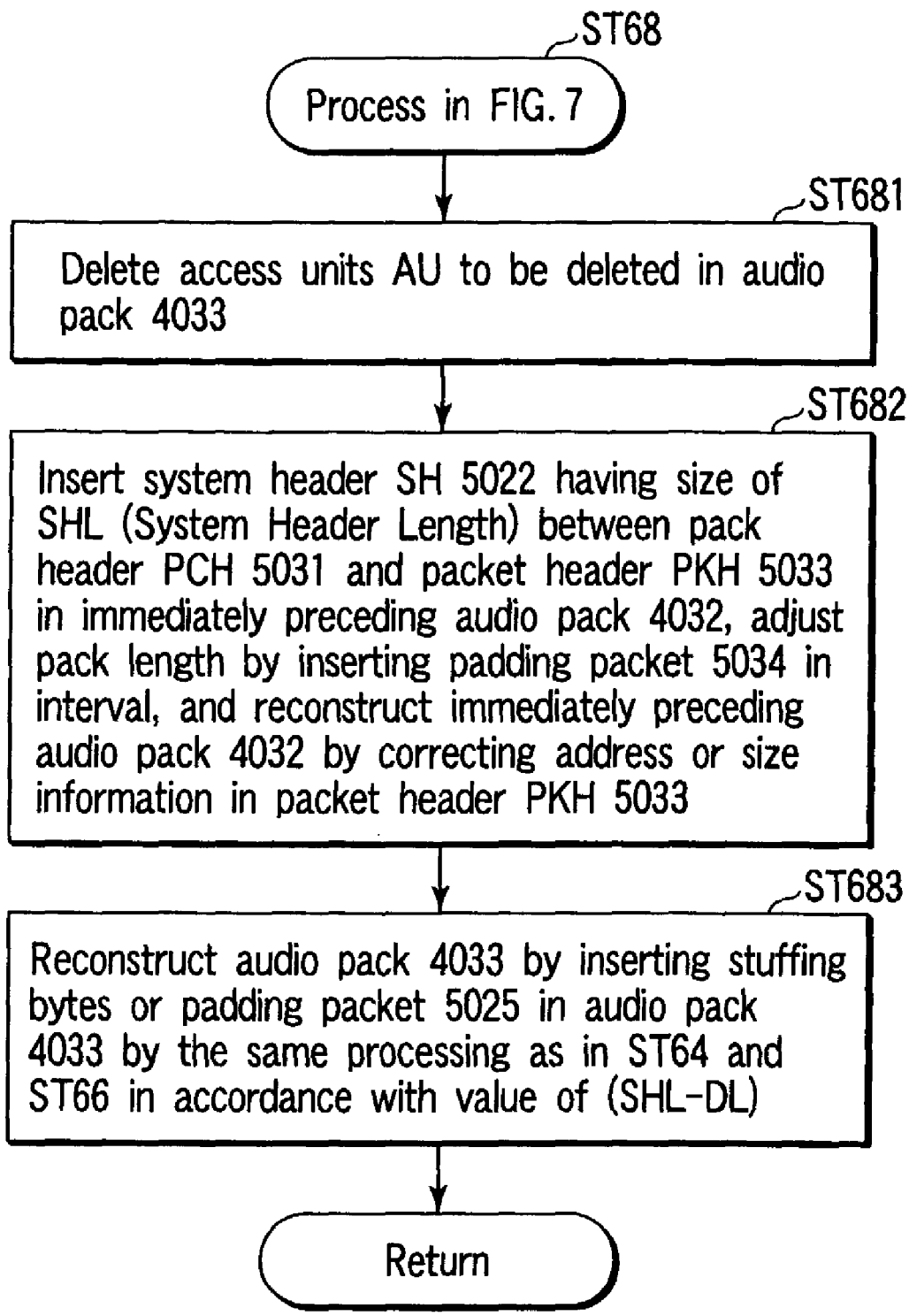
FIG. 11 is a flow chart for explaining the processing in step ST68 of FIG. 8.

FIG. 11 is a flow chart for explaining the contents of the processing in step ST68 in FIG. 8 (i.e., the method of inserting the system header 5022 in the process shown in FIG. 7). First, an access unit AU (5014 in FIG. 7) to be deleted in this audio pack 4033 is deleted (step ST681). Next, a system header SH 5022 having a size SHL (System Header Length) is inserted between a pack header PCH 5031 and packet header PKH 5033 in an immediately preceding audio pack 4032, and a padding packet 5034 is inserted in an interval in this immediately preceding audio pack 4032, thereby adjusting the pack length of the immediately preceding audio pack 4032. In addition, address and/or size information in the packet header PKH 5033 is appropriately corrected to reconstruct the immediately preceding audio pack 4032 (step ST682) In accordance with the value of (DL−SHL or SHL−DL), stuffing bytes and/or a padding packet 5025 is properly inserted in the audio pack 4033 by the same processing as in step ST64 (FIG. 5) and step ST66 (FIG. 6), thereby reconstructing this audio pack 4033 (step ST665). In this way, the system header insertion process in step ST68 is complete.

In this embodiment as described above, when a portion DR of an audio object 401 comprising a head pack 4031 having a system header is deleted, a copy 5022 of the system header of the head pack 4031 is inserted in a pack 4033 which is the end boundary of deletion (the adjacent boundary of an access unit as a decoding unit) as shown in FIG. 5. As a result, a new head pack 4033 after the deletion comprises a system header 5022 having the same contents as the deleted pack 4031.

Alternatively, when a portion DR of an audio object 401 comprising a head pack 4031 having a system header is deleted, a copy 5022 of the system header of the head pack 4031 is inserted in a pack 4032 immediately preceding a pack 4033 which is the end boundary of deletion (the adjacent boundary of an access unit as a decoding unit) as shown in FIG. 7. In this case, the contents of the immediately preceding pack 4032 (the contents of the access unit) are deleted, and this pack 4032 as a vessel is used for the system header. As a result, a new head pack 4032 after the deletion comprises a system header 5022 having the same contents as the deleted pack 4031.

Other embodiments will be described below.

Figure 12:
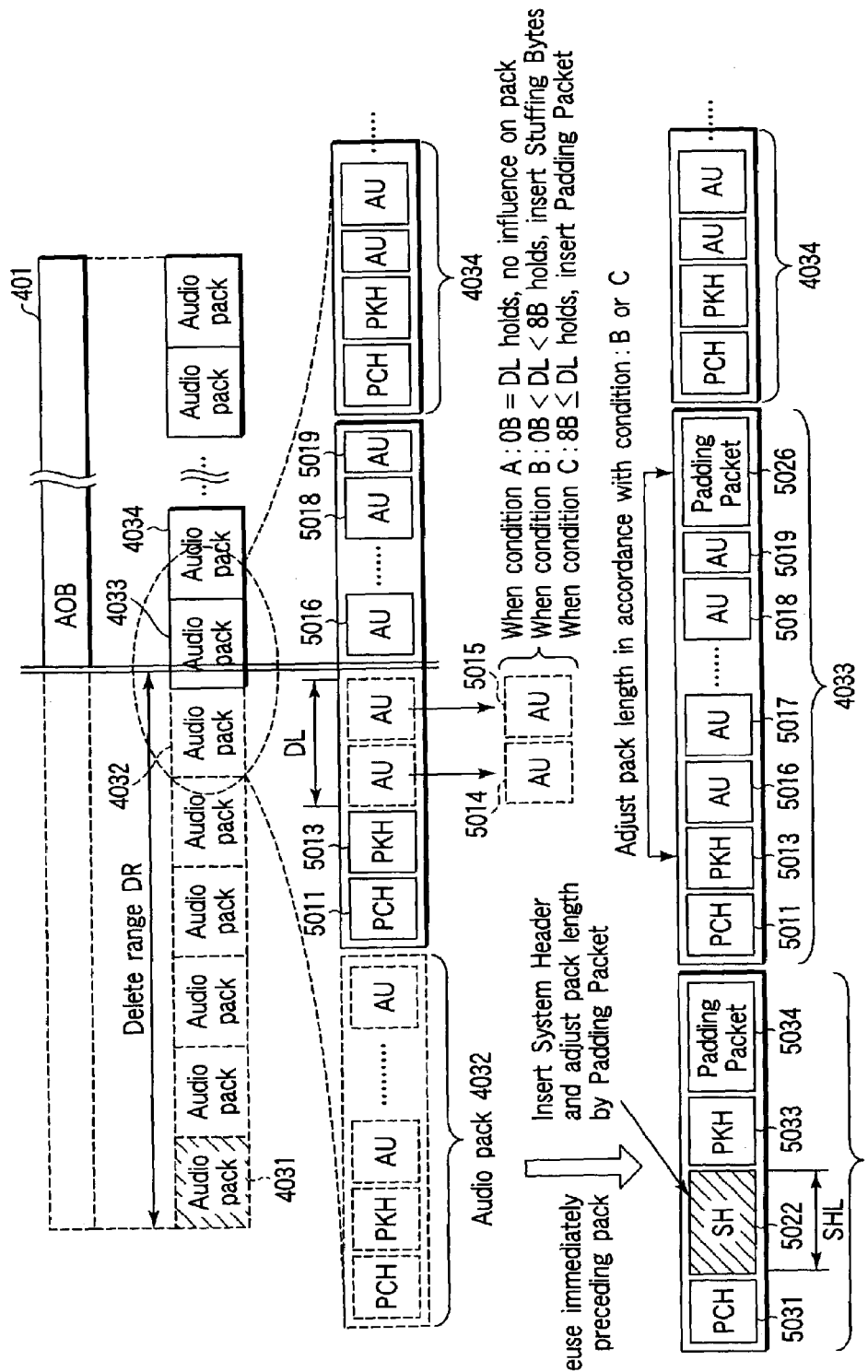
FIG. 12 is a view for explaining a system header insertion method when an audio object AOB is partially deleted in a second embodiment of the present invention.

FIG. 12 is a view for explaining a system header insertion method (using an immediately preceding audio pack) when an audio object AOB is partially deleted in a second embodiment of the present invention. Assume that in certain reproduced data (AOB) 401, a region from a head pack 4031 comprising a system header 5022 to an access unit AU in an audio pack 4033 at the end point of a delete range DR is deleted. The pack length of this audio pack 4033 is adjusted in accordance with condition determination based on the delete range in the audio pack 4033, i.e., the size of a delete length DL. In addition, when a region from the head pack 4031 comprising the system header 5022 to access units AU 5014 and AU 5015 in the audio pack 4033 at the end point of deletion is deleted, an audio pack 4032 immediately preceding the audio pack 4033 at the end point of deletion is used as a pack for inserting a system header.

In this embodiment shown in FIG. 12, regardless of the value of the delete range DL in the audio pack 4033 at the end point of deletion, the immediately preceding audio pack 4032 is used as a system header insertion pack, and the system header 5022 is inserted between a pack header 5031 and packet header PKH 5033 in this immediately preceding audio pack 4032. The length of this immediately preceding audio pack 4032 is adjusted by inserting a padding packet 5034 in an entire remaining area following the packet header PKH 5033 in the immediately preceding audio pack 4032. Furthermore, this immediately preceding audio pack 4032 is made effective by properly correcting address and/or size information in the packet header PKH 5033. Also, in accordance with the value of the delete range DL in the audio pack 4033, the pack length of this audio pack 4033 is adjusted as follows.

When a determination condition A: 0 B=DL holds, the audio pack 4033 need not be corrected, so the deletion process for the reproduced data AOB 401 is complete.

When a determination condition B: 0 B<DL<8 B holds, the length of the audio pack 4033 is adjusted by inserting stuffing bytes of 1 to 7 bytes in a packet header PKH 5013. In addition, address and/or size information in the packet header PKH 5013 is appropriately corrected to complete the deletion process for the reproduced data AOB 401.

When a determination condition C: 8 B≦DL holds, access units AU (5016 to 5019 in FIG. 12) remaining in the audio pack 4033 are arranged subsequently to the packet header PKH 5013, thereby reconstructing this audio pack 4033. Also, a padding packet 5026 of 8 bytes or more is inserted after the subsequently arranged access units AU (5016 to 5019) in the audio pack 4033, thereby adjusting the length of this audio pack 4033. Furthermore, address and/or size information in the packet header PKH 5013 is appropriately corrected to complete the deletion process for the reproduced data AOB 401.

Figure 13:
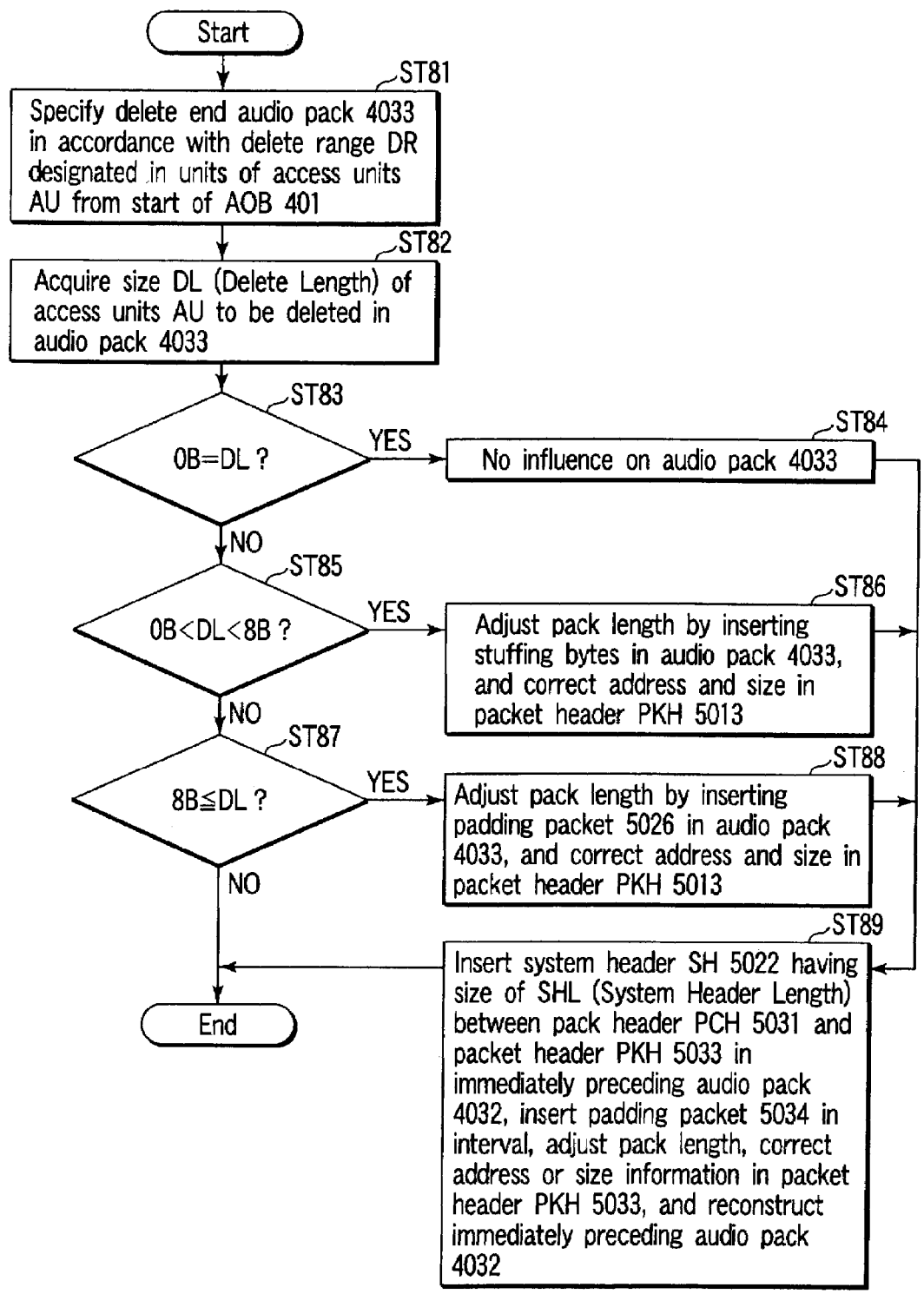
FIG. 13 is a flow chart for explaining the method of the system header insertion process of the second embodiment.

FIG. 13 is a flow chart for explaining the method of the system header insertion process according to the embodiment explained in FIG. 12. First, a delete range DR is specified in units of access units AU (playback decoding units) from the start of reproduced data AOB 401. When this delete range DR is specified, an audio pack 4033 at the end point of deletion is specified in accordance with the delete range DR (step ST81).

Next, a size DL of access units AU to be deleted in this audio pack 4033 is acquired (step ST82).

Determination using a determination condition expression: 0 B=DL is then performed (step ST83). If this determination is true (YES in step ST83), there is no influence on the audio pack 4033 (step ST84), so the flow advances to the next processing (step ST89).

If the determination is false (NO in step ST83), determination using a determination condition expression: 0 B<DL<8 B is performed (step ST85). If this determination is true (YES in step ST85), the length of the audio pack 4033 is adjusted by inserting stuffing bytes in this audio pack 4033 (step ST86). In addition, address and/or size information in a packet header PKH 5013 is properly corrected, and the flow advances to the next processing (step ST89).

If the determination is false (NO in step ST85), determination using a determination condition expression: 8 B≦DL is performed (step ST87) If this determination is true (YES in step ST87), the length of the audio pack 4033 is adjusted by inserting a padding packet 5026 in this audio pack 4033 (step ST88). In addition, address and/or size information in the packet header PKH 5013 is properly corrected, and the flow advances to the next processing (step ST89).

In the next processing (step ST89), a system header SH 5022 having a size SHL is inserted between a pack header PCH 5031 and packet header PKH 5033 in an immediately preceding audio pack 4032. A padding packet 5034 is inserted in an interval in this immediately preceding audio pack 4032, thereby adjusting the length of the audio pack 4032 (step ST89). Furthermore, the immediately preceding audio pack 4032 is reconstructed by appropriately correcting address and/size information in the packet header PKH 5033.

On the other hand, if the determination is false (NO in step ST87), or after the processes in steps ST84, ST86, ST88, and ST89 based on the respective determination condition expressions are executed, the system header insertion process shown in FIG. 13 is complete.

In the second embodiment of the present invention, when a portion DR of an audio object 401 comprising a head pack 4031 having a system header is deleted, a copy 5022 of the system header of the pack 4031 is inserted in a pack 4032 immediately preceding a pack 4033 which is the end boundary of deletion (the adjacent boundary of an access unit as a decoding unit) as shown in FIG. 12. In this case, the contents of the immediately preceding pack 4032 (the contents of the access unit) are deleted, and this pack 4032 as a vessel is used for the system header. Consequently, a new head pack 4032 after the deletion comprises a system header 5022 having the same contents as the deleted pack 4031.

Figure 14:
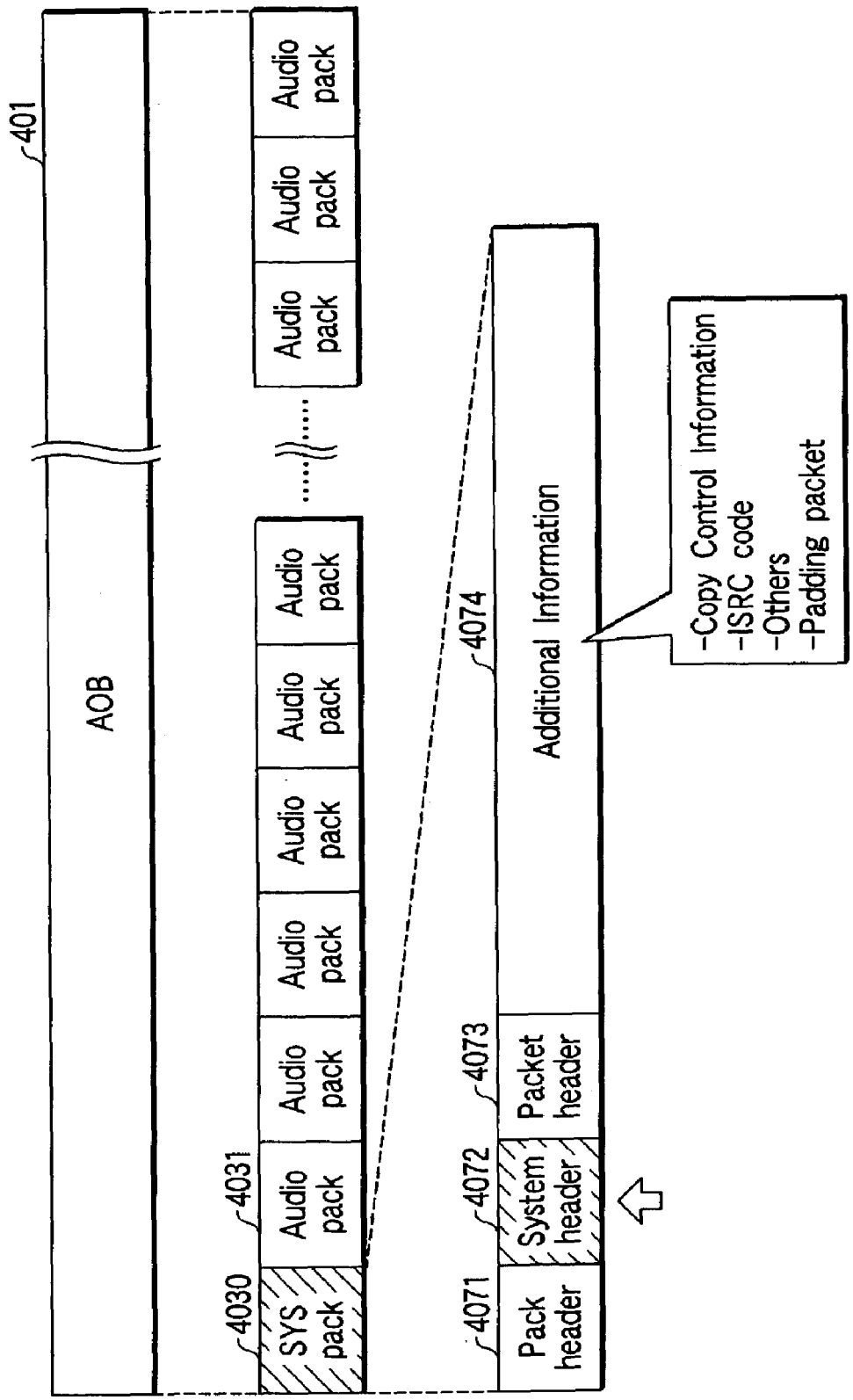
FIG. 14 is a view for explaining a method of adding a system dedicated pack to the head of an audio object AOB in a third embodiment of the present invention.

FIG. 14 is a view for explaining a method of adding a system dedicated pack to the start of an audio object AOB in a third embodiment of the present invention. In this embodiment, a system pack 4030 dedicated to store a system header is formed at the start of reproduced data AOB 401. Referring to FIG. 14, a system header 4072 is inserted between a pack header 4071 and packet header 4073 in the system pack 4030. A packet data portion in this system pack 4030 can be used as additional information 4074. As this additional information 4074, it is possible to store copy control information, ISRC (International Standard Recording Code), text information, others, and information pertaining to the reproduced data AOB 401.

Figure 15:
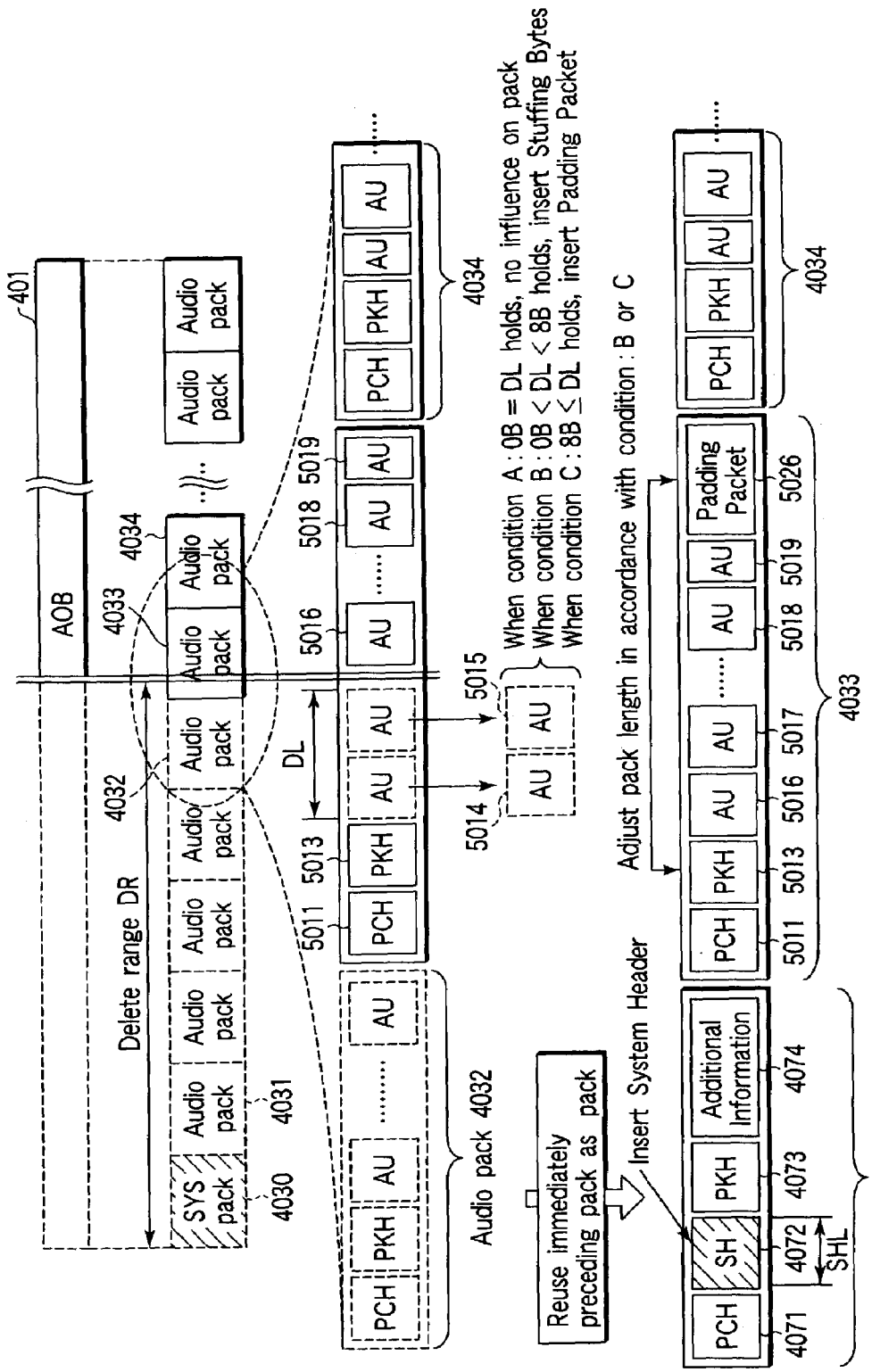
FIG. 15 is a view for explaining a method of inserting a system header in a system dedicated pack when a portion (front side) of an audio object AOB is deleted in a fourth embodiment of the present invention.

FIG. 15 is a view for explaining a method of inserting a system header in a system dedicated pack when a portion (front side) of an audio object AOB is deleted in a fourth embodiment of the present invention. That is, FIG. 15 shows a method by which, when a region from a head pack 4030 comprising a system header 4072 to access units AU (5014 and 5015 in FIG. 15) in an audio pack 4033 at the end point of deletion is deleted in reproduced data AOB 401 having a system pack 4030 at its start as shown in FIG. 14, an audio pack 4032 immediately preceding the audio pack 4033 at the end point of deletion is used as the system pack 4030 for inserting the system header. FIG. 15 also shows a method of adjusting the pack length of the audio pack 4033 in accordance with condition determination based on the size of a delete length DL in this audio pack 4033.

More specifically, referring to FIG. 15, regardless of the value of the delete range DL in the audio pack 4033 at the end point of deletion, the immediately preceding audio pack 4032 is used as the system header insertion pack 4030, and the system header 4072 is inserted between a pack header 4071 and packet header 4073 in this immediately preceding audio pack 4032. The pack length is adjusted by inserting a padding packet (or a packet of additional information 4074, i.e., an additional information packet 4074 in FIG. 15) in an entire remaining area following the packet header 4073 in the pack 4032. Furthermore, this immediately preceding audio pack 4032 is made effective as the system pack 4030 by properly correcting address and/or size information in the header 4073. Also, in accordance with the value of the delete range DL in the audio pack 4033, the pack length of this audio pack 4033 is adjusted as follows.

When a determination condition A: $0 \, B=DL$ holds, the audio pack 4033 need not be corrected, so the deletion process for the reproduced data AOB 401 is complete.

When a determination condition B: $0 \, B<DL<8 \, B$ holds, the pack length is adjusted by inserting stuffing bytes of 1 to 7 bytes in a packet header PKH 5013. In addition, address and/or size information in the packet header PKH 5013 is appropriately corrected to complete the deletion process for the reproduced data AOB 401.

When a determination condition C: $8 \, B \leq DL$ holds, access units AU (5016 to 5019 in FIG. 15) remaining in the audio pack 4033 are arranged subsequently to the packet header PKH 5013, thereby reconstructing this audio pack 4033. Also, a padding packet 5026 of 8 bytes or more is inserted after the last access unit AU 5019 in the audio pack 4033, thereby adjusting the length of this audio pack 4033. Furthermore, address and/or size information in the packet header PKH 5013 is appropriately corrected to complete the deletion process for the reproduced data AOB 401.

Figure 16:
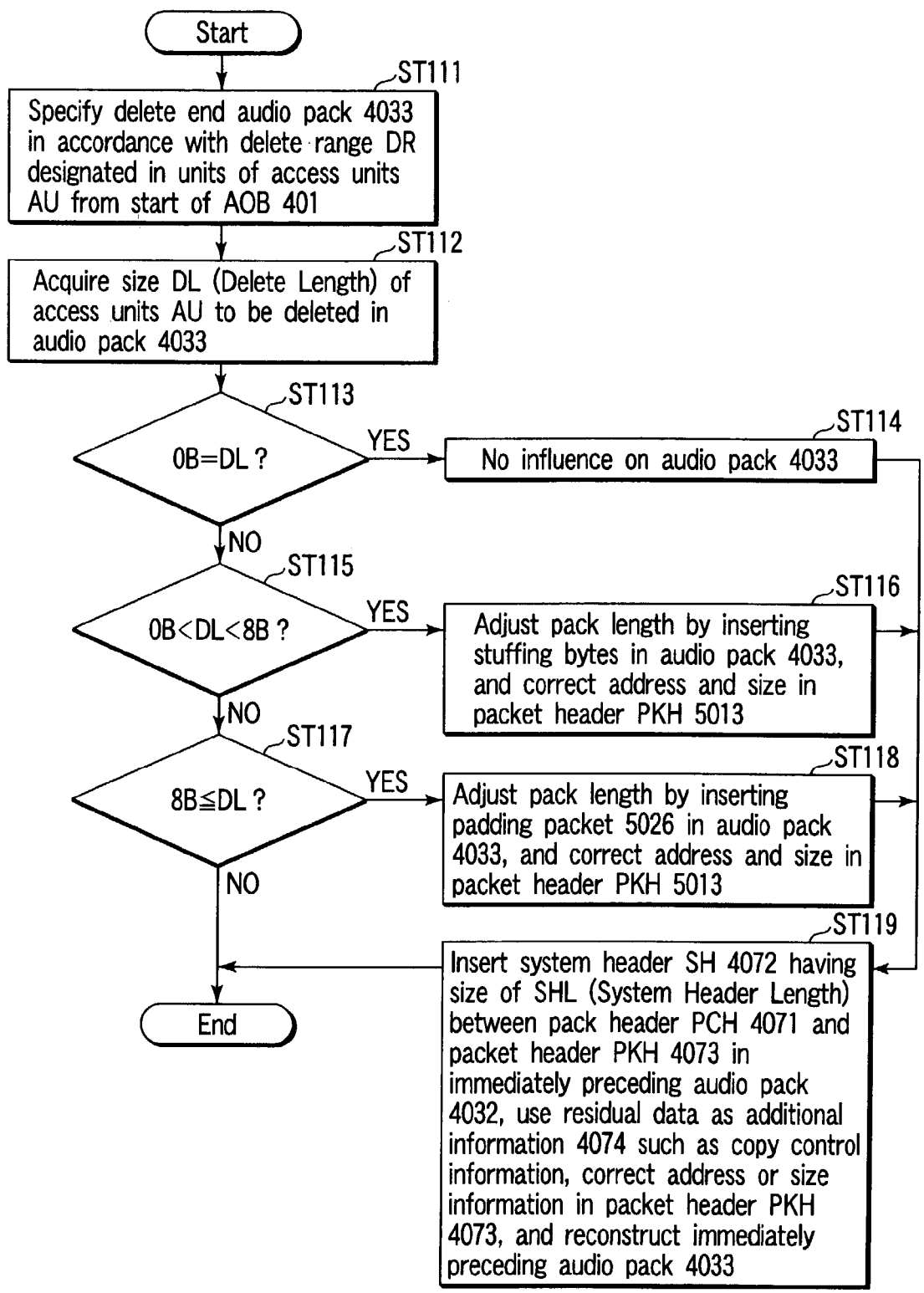
FIG. 16 is a flow chart for explaining the method of inserting the system header in the system dedicated pack according to the fourth embodiment.

FIG. 16 is a flow chart for explaining the method of the process of inserting a system header in a system dedicated pack according to the fourth embodiment explained in FIG. 15. First, a delete range DR is specified in units of access units AU (playback decoding units) from the start of reproduced data AOB 401. When this delete range DR is specified, an audio pack 4033 at the end point of deletion is specified in accordance with the delete range DR (step ST111).

Next, a size DL of access units AU (5016 to 5019 in FIG. 15) to be deleted in this audio pack 4033 is acquired (step ST112).

Determination using a determination condition expression: $0 \, B=DL$ is then performed (step ST113). If this determination is true (YES in step ST113), there is no influence on the audio pack 4033 (step ST114), so the flow advances to the next processing (step ST119).

If the determination is false (NO in step ST113), determination using a determination condition expression: $0 \, B<DL<8 \, B$ is performed (step ST115). If this determination is true (YES in step ST115), the length of the audio pack 4033 is adjusted by inserting stuffing bytes in this audio pack 4033 (step ST116). In addition, address and/or size information in a packet header PKH 5013 is properly corrected, and the flow advances to the next processing (step ST119).

If the determination is false (NO in step ST115), determination using a determination condition expression: $8 \, B \leq DL$ is performed (step ST117)

If this determination is true (YES in step ST117), the pack length is adjusted by inserting a padding packet 5026 in the audio pack 4033 (step ST118). In addition, address and/or size information in the packet header PKH 5013 is properly corrected, and the flow advances to the next processing (step ST119).

In this processing in step ST119, a system header SH 4072 having a size SHL is inserted between a pack header PCH 4071 and packet header PKH 4073 in an immediately preceding audio pack 4032. A data portion remaining in the pack 4032 is used as additional information 4074 such as copy control information. The length of the pack 4032 is adjusted by this additional information 4074. In addition, the immediately preceding audio pack 4032 is reconstructed as a system dedicated pack 4030 by appropriately correcting address and/size information in the header 4073.

On the other hand, if the determination is false (NO in step ST117), or after the processes in steps ST114, ST116, ST118, and ST119 based on the respective determination condition expressions are executed, the process of inserting the system header in the system dedicated pack 4032 (4030) is complete.

In this fourth embodiment of the present invention, a system dedicated pack 4030 having a system header SH 4072 is placed at the start of an audio object 401. When a portion DR of the audio object 401 comprising this system dedicated pack 4030 is to be deleted, a copy of the system dedicated pack 4030 is inserted in a field where a pack 4032 immediately preceding a pack 4033 which is the end boundary of deletion (the adjacent boundary of an access unit as a decoding unit) was present as shown in FIG. 15. As a result, a new head pack 4032 after the deletion functions as a new system dedicated pack (the contents are the same as 4030).

FIG. 17 is a view for explaining a method of inserting a system header in a system dedicated pack when a portion (rear side) of an audio object AOB is deleted in a fifth embodiment of the present invention. That is, FIG. 17 shows an example in which a head pack 4030 comprising a system header of reproduced data AOB 401 is not deleted, and a rear side of this AOB 401 is deleted. In this example, a portion after access units AU in an audio pack 4033 at the start point of deletion is deleted. Therefore, this deletion has no effect on the system header 4030 at the start of the AOB 401. So, the pack length of the audio pack 4033 need only be adjusted by condition determination based on the size of a delete range DL in this audio pack 4033.

Referring to FIG. 17, in accordance with the value of the delete range DL in the audio pack 4033 at the start point of deletion, the pack length of this audio pack 4033 is adjusted as follows.

When a determination condition A: $0 \, B=DL$ holds, the audio pack 4033 need not be corrected, so the deletion process for the reproduced data AOB is complete.

When a determination condition B: $0 \, B<DL<8 \, B$ holds, the pack length is adjusted by inserting stuffing bytes of 1 to 7 bytes in a packet header PKH 5013. In addition, address and/or size information in the packet header PKH 5013 is appropriately corrected to complete the deletion process for the reproduced data AOB 401.

When a determination condition C: $8 \, B \leq DL$ holds, access units AU (5014 to 5016 in FIG. 17) remaining in the audio pack 4033 are arranged subsequently to the packet header PKH 5013, thereby reconstructing this audio pack 4033. Also, a padding packet 5027 of 8 bytes or more is inserted after the last AU 5016 in the audio pack 4033, thereby adjusting the pack length. Furthermore, address and/or size information in the packet header PKH 5013 is appropriately corrected to complete the deletion process for the reproduced data AOB 401.

If a head pack comprising a system header is not deleted in reproduced data AOB 401 and an intermediate portion of this reproduced data AOB 401 is deleted, the AOB 401 is split into two portions. In this case, a deletion process can be executed for the front AOB comprising the system header by the method shown in FIG. 17, and can be executed for the rear AOB not comprising the system header by the method shown in any of FIGS. 5 to 7, 12, and 15.

FIGS. 18A and 18B are views for explaining a method of adjusting the pack length of a data pack used in a sixth embodiment of the present invention. That is, FIGS. 18A and 18B illustrate a method of adjusting a pack length of 2,048 bytes in a pack of a pack string which forms reproduced data AOB based on an MPEG program stream and recorded by the apparatus as shown in FIG. 2. One packet is normally stored in one pack. Each pack includes a pack header (1061 or 1071), packet header (1063 or 1073), private header (1069 or 1079), and packet data (1064 or 1074).

FIG. 18A shows a packet structure when the pack length is adjusted by inserting stuffing bytes 1066 in the private header 1069 if a data interval of 1 to 7 bytes (or 1 to 15 bytes) is present in the packet header 1063.

FIG. 18B also shows a packet structure when the pack length is adjusted by using a padding packet 1076 if a data interval of 8 bytes or more (or 9 to 16 bytes or more) is present. These pack length adjusting data (stuffing bytes 1066 and padding packet 1076) are discarded when reproduced data is decoded.

Figure 19:
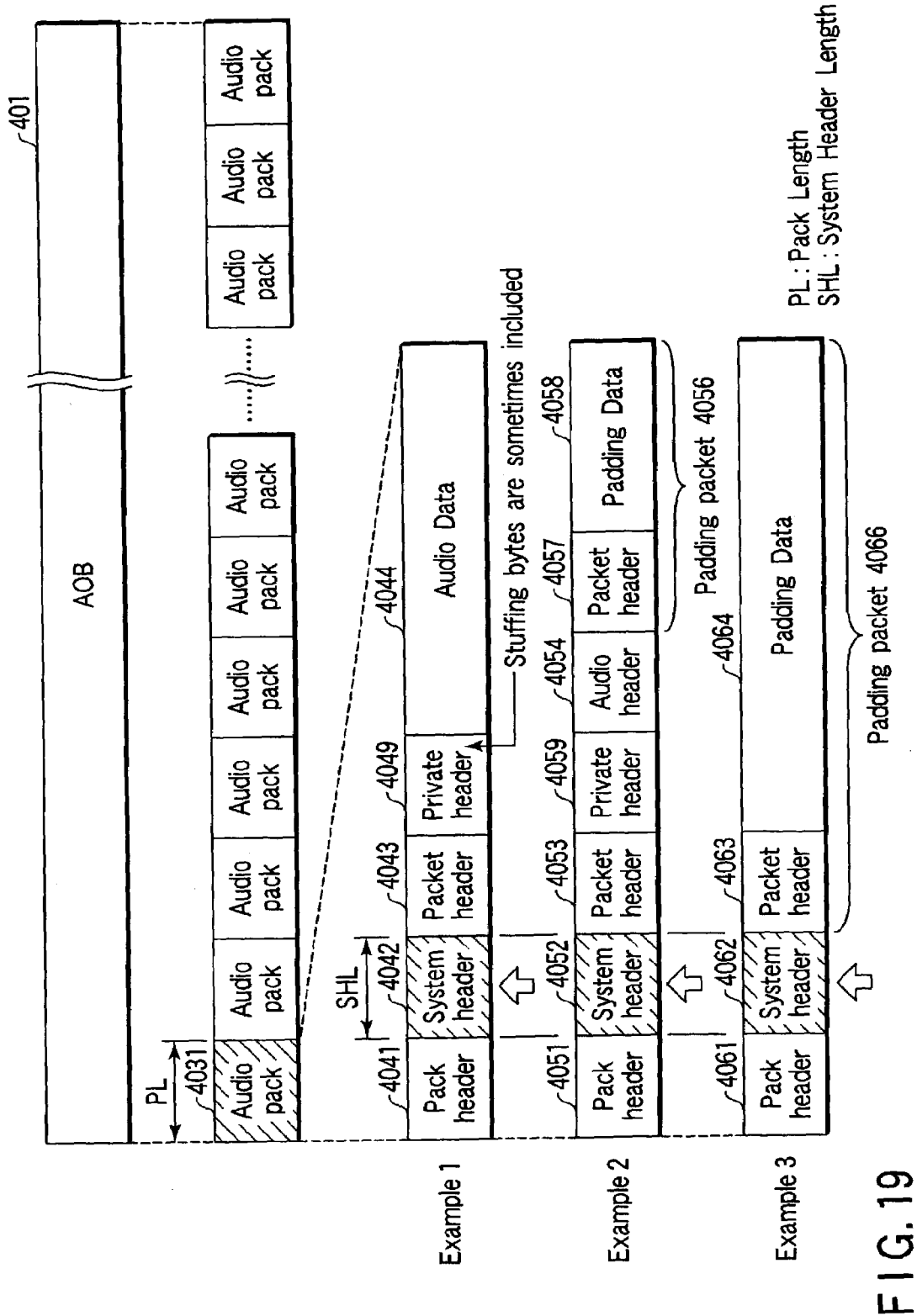
FIG. 19 is a view for explaining a method of adding a system header to the head audio pack of an audio object AOB in a seventh embodiment of the present invention.

FIG. 19 is a view for explaining a method of adding a system header to the head audio pack of an audio object AOB in a seventh embodiment of the present invention. Examples 1, 2, and 3 illustrate the forms of packs when system headers 4042, 4052, and 4062 are inserted in an audio pack 4031. An audio object (AOB) 401 formed by the audio packs 4031 is based on an MPEG program stream, and the system headers 4042, 4052, and 4062 are inserted in the stream head pack 4031. The pack length of this head pack 4031 is represented by PL (Pack Length), and the data length of the system headers 4042, 4052, and 4062 in the head pack 4031 is represented by SHL (System Header Length). In this embodiment, PL is 2,048 bytes, and SHL is 18 bytes.

Example 1 shows the form of a pack when the audio pack 4031 having the system header 4042 after a pack header 4041 includes only an audio packet (audio data 4044). In this pack, the pack length can be properly adjusted by stuffing bytes in a private header 4049 after the system header 4042 and a packet header 4043.

Example 2 shows the form of a pack when the audio pack 4031 having the system header 4052 after a pack header 4051 includes both an audio packet (audio data 4054) and a padding packet 4056. In this pack, a packet header 4053 and private header 4059 follow the system header 4052, the audio data 4054 follows the private header 4059, and the padding packet 4056 follows the audio data 4054. The padding packet 4056 includes a packet header 4057 and padding data 4058 following the packet header 4057.

Example 3 shows the form of a pack when the audio pack 4031 having the system header 4062 after a pack header 4061 includes only a padding packet 4066. In this pack, the padding packet 4066 follows the system header 4062. The padding packet 4066 includes a packet header 4063 and padding data 4064 following the packet header 4063.

When stuffing bytes are to be inserted in the audio packs shown in FIGS. 18A, 18B, and 19 in the system header insertion methods shown in FIGS. 5 to 17, these stuffing bytes are inserted in a private header, not in a packet header, by a similar method.

The present invention is not limited to the above embodiments and can be modified and changed when practiced without departing from the spirit and scope of the invention. Also, these embodiments can be appropriately combined as much as possible when they are practiced. In this case, effects by the combinations can be obtained.

Each embodiment includes inventions in various stages, so various inventions can be extracted by properly combining a plurality of constituent elements disclosed in this application. For example, even when one or a plurality of constituent elements are deleted from all the constituent elements disclosed in the embodiments, if at least one of the effects of the present invention or the effects obtained when the present invention is practiced is obtainable, this arrangement from which the constituent elements are deleted can be extracted as an invention.

According to the embodiments of the present invention, in the method of editing (including deleting) audio data (AOB) comprising a head audio pack 4031 having a system header 4042 to 4062, or 5022 at the start of a program stream 101 (FIG. 1) or 401 (FIGS. 4 to 7, 12, 14, 15, and 17) having a pack and packet structure and based on the MPEG standard, one of methods (FIGS. 5 to 7 and 12) of inserting and recording a system header 5022 is appropriately selected (ST63 to ST68 in FIG. 8; or ST83 to ST89 in FIG. 13) in accordance with a delete range (a delete length DL in a delete range DR) in an audio pack 4033 comprising a delete point of the audio data AOB.

Regardless of the delete range (the delete length DL in the delete range DR) in the audio pack 4033 comprising the delete point of the audio data AOB, the system header 5022 is inserted and recorded by using an audio pack (4032 in FIG. 7) to be deleted which immediately precedes the audio pack 4033 comprising the delete point of the audio data AOB (regardless of whether YES in ST83, ST85, or ST87 in FIG. 13, in ST89 the system header 5022 is eventually inserted in the immediately preceding pack 4032 shown in FIG. 12).

Alternatively, regardless of the delete range (the delete length DL in the delete range DR) in the audio pack 4033 comprising the delete point of the audio data AOB, a system dedicated pack 4030 comprising a system header 4072 is inserted and recorded in a position (the position of the immediately preceding pack 4032 to be deleted) immediately preceding the audio pack 4033 comprising the delete point of the audio data AOB (regardless of whether YES in ST113, ST115, or ST117 in FIG. 16, in ST119 the system header 4072 is eventually inserted in the immediately preceding pack 4032=system dedicated pack 4030 shown in FIG. 15).

<Summary of Embodiments>

There is provided a method and apparatus of inserting a system header which disappears by deletion, editing, or the like in reproduced data AOB which forms a pack string based on an MPEG program stream.

(A) A method and apparatus of inserting a system header in an audio packet is determined in accordance with condition determination based on the size of deleted data and the size of a system header.

(B) An audio pack immediately preceding a delete point is used as an audio pack for inserting a system header.

(C) A system header dedicated pack capable of storing additional information is formed.

<Summary of Effects of Embodiments>

<a> In deleting an MPEG program stream having a system header, a system header insertion/recording method is selected in accordance with a delete range (delete length) DL. This minimizes correction of the recorded stream and increases the speed of the delete process, and makes it possible to maintain a stream based on an MPEG standard program stream.

<b> In deleting an MPEG program stream having a system header, a system header insertion method is selected in accordance with a delete range (delete length) DL in an audio pack comprising a delete point. This minimizes correction of the recorded stream and increases the speed of the delete process, and makes it possible to maintain a stream based on an MPEG standard program stream.

<c> In deleting an MPEG program stream having a system header, an appropriate system header insertion method is selected in accordance with a difference (DL−SHL) between a delete range (delete length) DL in an audio pack comprising a delete point and a size SHL of the system header. This minimizes correction of the recorded stream, and makes it possible to provide an efficient delete process and maintain a stream based on an MPEG standard program stream.

<d> In deleting an MPEG program stream having a system header, a system header is inserted by using an immediately preceding audio pack regardless of a delete range (delete length) DL in an audio pack comprising a delete point. Accordingly, it is possible to realize a simple delete process following a consistent procedure, and maintain a stream based on an MPEG standard program stream.

<e> In deleting an MPEG program stream having a system header, a system header is inserted by placing a system dedicated pack preceding to an audio pack to be deleted, regardless of a delete range (delete length) DL in an audio pack comprising a delete point. Accordingly, a simple delete process following a consistent procedure can be realized. Also, a blank portion (which is filled with a padding packet when not used) of the system dedicated pack can be used as a field for storing additional information such as copy control information.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of processing information comprising a system header at a head of a program stream based on MPEG standard, the method comprising:
calculating a delete range of the information; and
selecting a method of inserting and recording the system header in accordance with the calculated delete range.

2. The method according to claim 1, wherein
the program stream based on the MPEG standard comprises a pack structure and a packet structure,
the information to be processed comprising audio data comprising a head audio pack, and
the method of inserting and recording the system header is selected in accordance with the calculated delete range in an audio pack comprising a delete point of the audio data.

3. The method according to claim 2, wherein the method of inserting and recording the system header is selected in accordance with a difference between the calculated delete range in the audio pack comprising the delete point of the audio data and a size of the system header to be inserted.

4. The method according to claim 3, wherein
letting p be the minimum size of a padding packet to be inserted to adjust the length of the audio pack, DL−SHL be the difference, SHL be a length of the system header, and DL be the delete range in the audio pack comprising the delete point of the audio data,
if a first condition, 0 byte≦(DL−SHL)<p bytes, holds, the system header is inserted in the audio pack, and the pack length of the audio pack is adjusted by using a predetermined stuffing byte,
if a second condition, p bytes≦(DL−SHL), holds, the system header is inserted in the audio pack, and the pack length of the audio pack is adjusted, where necessary, by using a predetermined padding packet, and
if a third condition, 0 byte>(DL−SHL), holds, the system header is inserted by using an audio pack to be deleted which immediately precedes the audio pack comprising the delete point of the audio data, the pack length of the immediately preceding audio pack is adjusted, where necessary, by using a predetermined padding packet, and the pack length of the audio pack is adjusted, where necessary, by using another predetermined stuffing byte or padding packet.

5. The method according to claim 2, wherein the selected method of inserting and recording the system header comprises a method which uses a stuffing byte and/or padding packet for adjusting the length of the audio pack.

6. The method according to claim 2, wherein the selected method of inserting and recording the system header comprises a method which uses an audio pack to be deleted which immediately precedes the audio pack comprising the delete point of the audio data.

7. A system header recording method of recording audio data comprising an audio pack having a system header in a program stream having a pack and packet structure based on MPEG standard, comprising:
inserting and recording a system dedicated pack comprising the system header in a position immediately preceding the audio pack comprising a delete point of the audio data regardless of a delete range in the audio pack comprising a delete point of the audio data.

8. The method according to claim 7, wherein the system dedicated pack comprising the system header includes predetermined additional information.

9. The method according to claim 7, wherein the inserting and recording are performed using an audio pack to be deleted which immediately precedes the audio pack comprising the delete point of the audio data.

10. The method according to claim 9, wherein
letting p be the minimum size of a padding packet to be inserted to adjust the length of the audio pack, and DL be the delete range in the audio pack comprising the delete point of the audio data,
if a first condition, 0 byte=DL, holds, the length of the audio pack is not adjusted,
if a second condition, 0 byte<DL<p bytes, holds, a predetermined stuffing byte is inserted, and if a third condition, p bytes≦DL, holds, a predetermined padding packet is inserted.

11. The method according to claim 9, wherein if the first condition holds, if the second condition holds and the predetermined stuffing byte is inserted, or if the third condition holds and the predetermined padding packet is inserted, the system header is inserted and recorded in an immediately preceding pack which immediately precedes the audio pack comprising the delete point of the audio data, and predetermined pack length adjustment is performed for this immediately preceding pack.

12. An apparatus for processing information comprising a system header at a head of a program stream based on MPEG standard, the apparatus comprising:
- a calculator which calculates a delete range of the information; and
- a selector which selects a method of inserting and recording the system header in accordance with the calculated delete range.

* * * * *